United States Patent
Hasegawa et al.

(10) Patent No.: US 8,821,668 B2
(45) Date of Patent: Sep. 2, 2014

(54) TUBULAR BODY MANUFACTURING METHOD AND TUBULAR BODY

(75) Inventors: Hiroshi Hasegawa, Kobe (JP); Masahide Onuki, Kobe (JP)

(73) Assignee: SRI Sports Limited, Kobe (JP)

( * ) Notice: Subject to any disclaimer, the term of this patent is extended or adjusted under 35 U.S.C. 154(b) by 1051 days.

(21) Appl. No.: 12/222,703

(22) Filed: Aug. 14, 2008

(65) Prior Publication Data
US 2009/0098324 A1 Apr. 16, 2009

(30) Foreign Application Priority Data

Oct. 11, 2007 (JP) ................... 2007-265788
Jan. 21, 2008 (JP) ................... 2008-009993
Feb. 29, 2008 (JP) ................... 2008-049412

(51) Int. Cl.
*B29C 70/00* (2006.01)
*B32B 1/08* (2006.01)
*B29C 70/44* (2006.01)
*B29C 53/60* (2006.01)

(52) U.S. Cl.
CPC ............... *B29C 70/446* (2013.01); *B29C 53/60* (2013.01); *B32B 1/08* (2013.01); *B29L 2031/227* (2013.01)
USPC .......................................... 156/187; 156/188

(58) Field of Classification Search
USPC .................. 156/187, 188, 184, 289
See application file for complete search history.

(56) References Cited

U.S. PATENT DOCUMENTS 3,442,738 A * 5/1969 Scott et al. ................ 156/161
3,646,610 A * 2/1972 Jackson ..................... 473/319
4,160,639 A * 7/1979 Umeda ...................... 425/383
4,900,048 A * 2/1990 Derujinsky ................ 280/281.1
5,242,721 A 9/1993 Oonuki et al.
5,348,777 A 9/1994 Oonuki et al.

(Continued)

FOREIGN PATENT DOCUMENTS

CN 1295918 A 5/2001
GB 1249980 A * 10/1971

(Continued)

OTHER PUBLICATIONS

Machine Trnaslationof Japanese Patent 2002-144439, date unknown.*

(Continued)

*Primary Examiner* — Jeff Aftergut
(74) *Attorney, Agent, or Firm* — Birch, Stewart, Kolasch & Birch, LLP

(57) ABSTRACT

The present invention relates to a method of manufacturing an FRP tubular body. The manufacturing method includes the steps of winding a fiber reinforced resin member containing a fiber and a matrix resin around a mandrel, thereby obtaining an intermediate formed body, winding a wrapping tape around an outer peripheral surface of the intermediate formed body (6) with an application of a tension, curing the matrix resin in the intermediate formed body having the wrapping tape wound therearound, and pulling the mandrel out and removing the wrapping tape after the curing step, thereby obtaining a cured tubular body. It is preferable that a fabric tape should be used as the wrapping tape. It is preferable that a tensile stress to be applied to the fabric tape (8) should be set to be equal to or higher than 5 (Mpa) and is equal to or smaller than 150 (Mpa) at the tape winding step. In the manufacturing method, the matrix resin can be effectively extracted at a subsequent step to the winding step.

12 Claims, 11 Drawing Sheets

(56) References Cited

U.S. PATENT DOCUMENTS

| | | | | |
|---|---|---|---|---|
| 5,585,062 | A | * | 12/1996 | Muramatsu et al. .......... 264/314 |
| 6,306,047 | B1 | * | 10/2001 | Kusumoto .................... 473/319 |
| 6,354,334 | B1 | * | 3/2002 | Ellyin et al. .................. 138/143 |

FOREIGN PATENT DOCUMENTS

| | | |
|---|---|---|
| JP | 2-217230 A | 8/1990 |
| JP | 3-227616 A | 10/1991 |
| JP | 5-111342 A | 5/1993 |
| JP | 10-272699 A | 10/1998 |
| JP | 11-156988 A | 6/1999 |
| JP | 2000-14277 A | 1/2000 |
| JP | 2002-144439 A | 5/2002 |
| JP | 2005-131838 A | 5/2005 |

OTHER PUBLICATIONS

Office Action mailed May 12, 2010 in Chinese Application No. 200810168879.5.

Japanese Office Action dated Dec. 13, 2011 for Japanese Application No. 2007-265788.

* cited by examiner

TUBULAR BODY MANUFACTURING METHOD AND TUBULAR BODY

This application claims priority on Patent Application No. 2007-265788 filed in JAPAN on Oct. 11, 2007, Patent Application No. 2008-009993 filed in JAPAN on Jan. 21, 2008, and Patent Application No. 2008-049412 filed in JAPAN on Feb. 29, 2008, the entire contents of which are hereby incorporated by reference.

BACKGROUND OF THE INVENTION

1. Field of the Invention

The present invention relates to a method of manufacturing a tubular body formed by a fine reinforced resin and the tubular body formed by the manufacturing method.

2. Description of the Related Art

In recent years, it has been desirable to develop a golf club shaft (hereinafter referred to as a shaft) capable of increasing a flight distance by a small force with an increase in the numbers of weak elderlies and woman golf players. In particular, a reduction in a weight of the shaft has been supposed to be one of effective means for solving the problem and various programs have been made.

As the programs, first of all, a change from steel to CFRP (carbon fiber reinforced plastic) can be taken in respect of a material. Also in the CFRP, a strength of a carbon fiber is enhanced, the physical properties of a resin are changed or a bonding strength of the carbon fiber and the resin is enhanced to increase a strength of the whole shaft, thereby reducing a weight correspondingly. As the program for the structure, moreover, the fiber is oriented or laminated at such an angle as to increase the strength so that the strength is increased to reduce the weight corresponding to the increase in the strength.

A tubular body formed by a fiber reinforced resin (which will be hereinafter referred to as an FRP tubular body) is used variously. For a method of manufacturing the FRP tubular body, a manufacturing method using a wrapping tape is well known. In the manufacturing method, a sheet-shaped FRP material is wound around a mandrel (cored bar) and a predetermined tension is then applied, and at the same time, a resin tape is wound therearound. In general, the resin tape is also referred to as a wrapping tape. A forming pressure is applied through the wrapping tape.

The wrapping tape is finally removed. In order to easily carry out the removal, a wrapping tape having a high mold releasing property is preferable. Japanese Laid-Open Patent Publication No. 2002-144439 has disclosed a wrapping tape having an internal surface in a fabric pattern in order to enhance the mold releasing property. More specifically, there has been disclosed a wrapping tape in which a fabric and a resin film are integrated with each other.

SUMMARY OF THE INVENTION

In order to reduce a weight of a shaft formed of CFRP, there have been employed methods of enhancing a strength of a fiber or a resin or a bond of the fiber and the resin to increase a strength of the whole shaft, thereby reducing a weight corresponding to the enhancement in the strength as described above. By the methods, the weight of the shaft has been reduced. However, there is also a limit to a development for enhancing the strength to correspondingly reduce the weight. On the other hand, the needs of a golf player have no limit and it has been demanded to slightly increase a flight distance. One of means for implementing the increase in the flight distance includes the reduction in the weight of the shaft, and the demand for the reduction in the weight of the shaft is endless. In order to realize the demand, there has been employed a technique for sacrificing characteristics (a flex and a torque) related to a rigidity of the shaft while maintaining a minimum strength which is required for the shaft. However, the reduction in the weight through the technique is also limited and a reduction in the rigidity also hinders the function of a club. How to further reduce the weight while maintaining the rigidity of the shaft is important.

As means for implementing the reduction in the weight while maintaining the rigidity of the shaft, it is possible to propose the use of CFRP having a high fiber content. In other words, by increasing the content of the fiber which mainly bears a strength and a rigidity of a tubular body to be a formed product, it is possible to enhance a strength and a rigidity per unit weight, thereby reducing the weight. In the forming through the CFRP having a high fiber content, however, a tacking property is insufficient. For this reason, the forming is hard to perform, and furthermore, air is apt to enter fiber reinforced resin member layers. In this case, moreover, a large amount of air is also contained in a material itself. Therefore, a large amount of air enters the whole tubular body. The air causes a void which might reduce a strength and a durability of the tubular body.

Thus, it is hard to simultaneously maintain the strength and the rigidity while reducing the weight.

In the wrapping tape according to the prior art, moreover, elongation rates of the fabric and the resin film are different from each other. For this reason, there might be generated phenomena in which the fabric and the resin film are partially separated from each other in an application of a tension, a tape is twisted, the tape is curved and a forming pressure is varied. Due to the phenomena, a surface of the FRP tubular body is apt to be uneven so that a defective product is easily manufactured or a strength is apt to be nonuniform.

The FRP tubular body having a small weight and a high strength is variously useful. In the FRP tubular body, for example, a golf club shaft, it is demanded to reduce the weight. A golf club shaft having a small weight can contribute to an increase in a head speed and a flight distance. In the present invention, a manufacturing method of obtaining an FRP tubular body having a small weight has been found based on completely new technical thoughts. In the manufacturing method, a step of winding a wrapping tape is different from that in the conventional method. In the manufacturing method, a resin contained in a fiber reinforced resin can be absorbed into the wrapping tape.

It is an object of the present invention to provide a method of manufacturing a tubular body which can reduce a resin content in a manufacturing process.

A method of manufacturing an FRP tubular body according to the present invention includes the steps of:

(1) winding a fiber reinforced resin member containing a fiber and a matrix resin around a mandrel, thereby obtaining an intermediate formed body;

(2) winding a wrapping tape around an outer peripheral surface of the intermediate formed body with an application of a tension;

(3) heating the intermediate formed body having the wrapping tape wound therearound, thereby curing the matrix resin; and (4) pulling the mandrel out and removing the wrapping tape after the curing step, thereby obtaining a cured tubular body.

In the manufacturing method, a fabric tape is used as the wrapping tape. In the manufacturing method, the fabric tape is directly wound around the outer peripheral surface of the intermediate formed body at the tape winding step.

In a preferable manufacturing method, the tape winding step includes:

(5) a first winding step of winding a fabric tape around the outer peripheral surface of the intermediate formed body, and (6) a second winding step of winding a resin film tape after the first winding step.

It is preferable that a tensile stress T1 to be applied to the fabric tape at the first winding step should be set to be equal to or higher than 5 (Mpa) and be equal to or lower than 150 (Mpa).

It is preferable that when a tensile stress to be applied to the fabric tape at the first winding step is represented by T1 and a tensile stress to be applied to the resin film tape at the second winding step is represented by T2, a ratio (T1/T2) should be equal to or higher than 0.1 and be equal to or lower than 0.95.

It is preferable that an internal surface of the resin film tape should be provided with a silicone type or fluorine type coating material.

Another method of manufacturing an FRP tubular body according to the present invention includes the steps of:

(7) winding a fiber reinforced resin member containing a fiber and a matrix resin around a mandrel, thereby obtaining an intermediate formed body;

(8) winding a wrapping tape around an outer peripheral surface of the intermediate formed body with an application of a tension;

(9) heating the intermediate formed body having the wrapping tape wound therearound, thereby curing the matrix resin; and

(10) pulling the mandrel out and removing the wrapping tape after the curing step, thereby obtaining a cured tubular body. When a fiber content of the intermediate formed body is represented by Z1 (% by weight) and a fiber content of the cured tubular body is represented by Z2 (% by weight), a difference (Z2−Z1) is equal to or greater than 3% by weight and is equal to or smaller than 25% by weight.

A further method of manufacturing an FRP tubular body according to the present invention includes the steps of:

(1) winding a fiber reinforced resin member containing a fiber and a matrix resin around a mandrel, thereby obtaining an intermediate formed body;

(2) winding a wrapping tape around an outside of the intermediate formed body with an application of a tension;

(3) heating the intermediate formed body having the wrapping tape wound therearound, thereby curing the matrix resin; and (4) pulling the mandrel out and removing the wrapping tape after the curing step, thereby obtaining a cured tubular body. The tape winding step includes at least:

(5a) a first winding step of winding a fabric tape around the outer peripheral surface of the intermediate formed body; and (6a) a second winding step of winding a rubber tape after the first winding step.

It is preferable that a tensile stress T1 to be applied to the fabric tape at the first winding step should be set to be equal to or higher than 5 (Mpa) and be equal to or lower than 150 (Mpa).

It is preferable that when a tensile stress to be applied to the fabric tape at the first winding step is represented by T1 and a tensile stress to be applied to the rubber tape at the second winding step is represented by T2, a ratio (T2/T1) should be equal to or higher than 0.1.

It is preferable that an internal surface of the rubber tape should be provided with a silicone type or fluorine type coating material.

A further method of manufacturing an FRP tubular body according to the present invention includes the steps of:

(7a) winding a fiber reinforced resin member containing a fiber and a matrix resin around a mandrel, thereby obtaining an intermediate formed body;

(8a) winding a wrapping tape around an outside of the intermediate formed body with an application of a tension;

(9a) heating the intermediate formed body having the wrapping tape wound therearound, thereby curing the matrix resin; and (10a) pulling the mandrel out and removing the wrapping tape after the curing step, thereby obtaining a cured tubular body. The tape winding step includes a step of using a rubber tape as the wrapping tape. When a fiber content of the intermediate formed body is represented by Z1 (% by weight) and a fiber content of the cured tubular body is represented by Z2 (% by weight), a difference (Z2−Z1) is equal to or greater than 3% by weight and is equal to or smaller than 25% by weight.

A further method of manufacturing an FRP tubular body according to the present invention includes the steps of:

(1) winding a fiber reinforced resin member containing a fiber and a matrix resin around a mandrel, thereby obtaining an intermediate formed body;

(2) winding a wrapping tape around an outer peripheral surface of the intermediate formed body with an application of a tension;

(3) heating the intermediate formed body having the wrapping tape wound therearound, thereby curing the matrix resin; and (4) pulling the mandrel out and removing the wrapping tape after the curing step, thereby obtaining a cured tubular body. In the manufacturing method, the wrapping tape is a fabric tape.

It is preferable that a tensile stress T1 to be applied to the fabric tape at the tape winding step should be equal to or greater than 5 (Mpa) and be equal to or smaller than 150 (Mpa).

It is preferable that a number L1 of wrapping layers of the fabric tape wound at the tape winding step is one or more on all points from a tip end position Tp1 of the tubular body to a butt end position Bt1 of the tubular body.

It is preferable that when a fiber content of the intermediate formed body is represented by Z1 (% by weight) and a fiber content of the cured tubular body is represented by Z2 (% by weight), a difference (Z2−Z1) should be equal to or greater than 3% by weight and is equal to or smaller than 25% by weight.

The tubular body according to the present invention is manufactured by any of the manufacturing methods described above.

According to the present invention, it is possible to reduce a fiber content in the manufacturing process, thereby obtaining a tubular body having a small weight.

DESCRIPTION OF THE PREFERRED EMBODIMENTS

The present invention will be described below in detail based on preferred embodiments with reference to the drawings.

With reference to FIGS. 1 to 4, description will be first given to an embodiment in which a fabric tape and a resin film tape are used as wrapping tapes.

Figure 1:
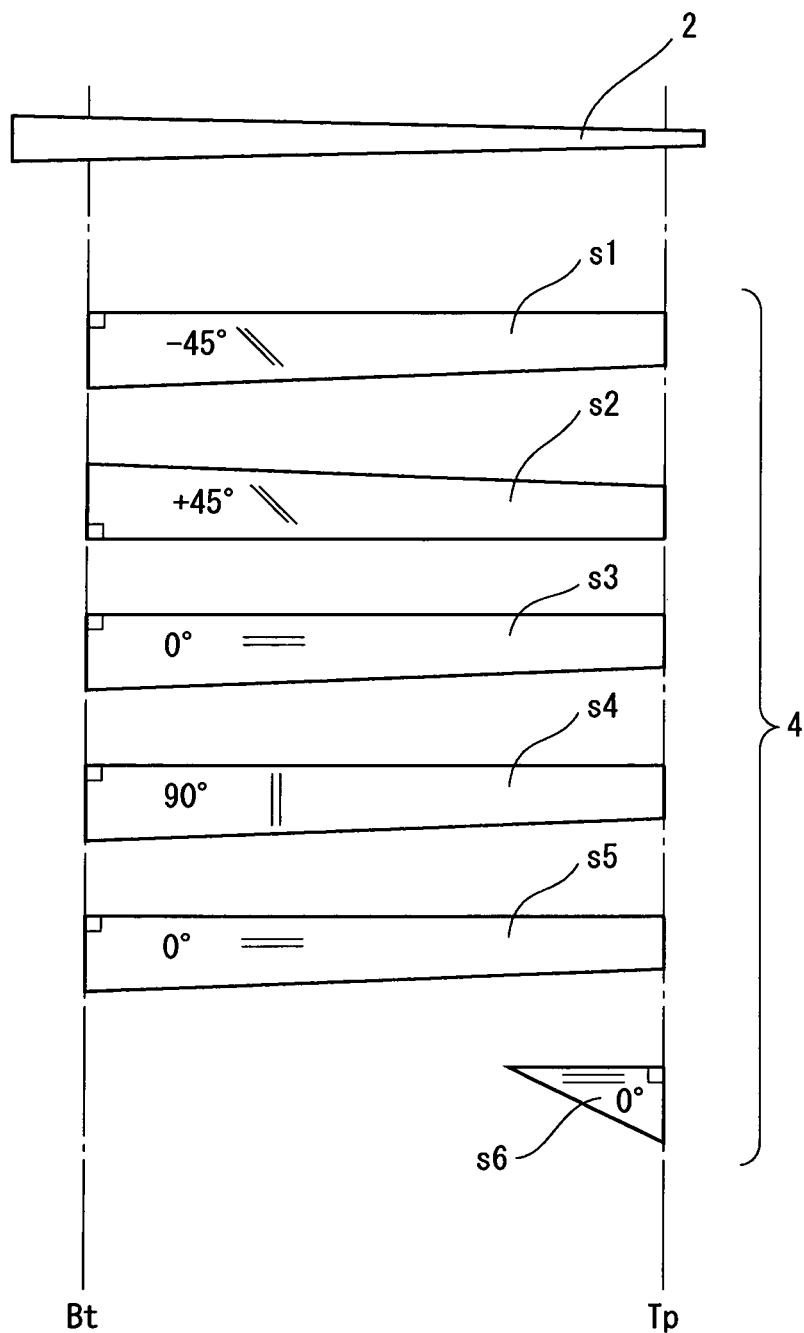
FIG. 1 is a view showing a mandrel and a prepreg which can be used in an embodiment according to the present invention.

In a manufacturing method according to the present invention which uses the fabric tape and the resin film tape, a tubular body formed by a fiber reinforced resin (an FRP tubular body) is obtained. FIG. 1 is a view for explaining a manufacturing method according to an embodiment of the present invention. As an example of a method of manufacturing the tubular body, description will be given to a method of manufacturing a golf club shaft. In the manufacturing method, first of all, a mandrel 2 and a fiber reinforced resin member 4 are prepared. The mandrel 2 is also referred to as a cored bar. A typical material of the mandrel 2 is a metal such as steel. A central axis of the mandrel 2 is an almost straight line. A sectional shape of the mandrel 2 is circular. The mandrel 2 has a taper. By the taper, the mandrel 2 becomes thinner toward one of ends thereof. The mandrel 2 may by partially parallel. In other words, the mandrel 6 may partially include a portion having a constant diameter. In the whole mandrel 2, the diameter may be constant.

The mandrel 2 forms a hollow portion of the tubular body obtained finally. A shape of the hollow portion of the tubular body is determined depending on a shape of the mandrel 2. As will be described below, the mandrel 2 is pulled out at a subsequent step. In order to easily carry out the pull-out, it is preferable that a surface of the mandrel 2 should be coated with a lubricant.

In the manufacturing method, first of all, a step of winding a fiber reinforced resin member around a mandrel is carried out. The step will be hereinafter referred to as a winding around step.

Prior to the winding around step, the fiber reinforced resin member is prepared. In the present embodiment, the fiber reinforced resin member is sheet-shaped. In the present embodiment, the fiber reinforced resin member is a prepreg 4. The manufacturing method in which the sheet-shaped fiber reinforced resin member is wound is also referred to as a sheet winding process. For the fiber reinforced resin member, a fiber impregnated with a liquid resin is illustrated in addition to the prepreg 4. An example of a process using the fiber includes a so-called filament winding process. The manufacturing method can also be applied to the filament winding process.

The prepreg 4 includes a fiber and a matrix resin. The fiber is a carbon fiber. The carbon fiber of the prepreg 4 is oriented in one direction. As will be described below, fibers other than the carbon fiber may be employed. In order to obtain a tubular body having a high strength and a small weight, the carbon fiber is preferable. At the winding around step, the matrix resin is not completely cured. Accordingly, the prepreg 4 has a flexibility. The flexibility permits the wind of the prepreg 4 around the mandrel 2. As will be described below, the matrix resin is not restricted but an epoxy resin is preferred.

Before the winding around step, the prepreg 4 is cut to have a desirable shape. In the embodiment shown in FIG. 1, six prepregs 4 are used. In the embodiment shown in FIG. 1, sheets s1 to s6 are shown as an example of the prepreg 4 which is cut. The prepreg 4 includes the sheets s1 to s2 for so-called angle layers, the sheets s3, s5 and s6 for straight layers and the sheet s4 for hoop layer. The prepreg 4 includes the full length sheets s1 to s5 provided over a full length of the shaft and the partial sheet s6 provided in a part in a longitudinal direction of the shaft. The specification of the prepreg 4 is not restricted. A shape, a thickness, a fiber type, a fiber content and the like of the prepreg 4 are not restricted.

At the winding around step, the sheets s1 to s6 are sequentially wound around the mandrel 2. Prior to the wind, the sheet s2 is laminated on the sheet s1. The sheet group thus laminated is wound around the mandrel 2. In the lamination, the sheet s2 is turned over. By the turnover, a fiber of the sheet s1 and that of the sheet s2 are oriented in reverse directions to each other. In FIG. 1, angles described in the sheets s1 to s6 indicate an angle formed by an axial direction of the shaft and an orientation of the fiber.

The sheets s1 to s6 are wound manually, for example. A winding machine (which is also referred to as a rolling machine) may be used. An intermediate formed body 6 is obtained through the winding around step. The intermediate formed body 6 is constituted by the wound prepreg 4. A section of the intermediate formed body 6 is formed by a whorl-like layer. The layer is formed by the prepreg 4.

Figure 2:
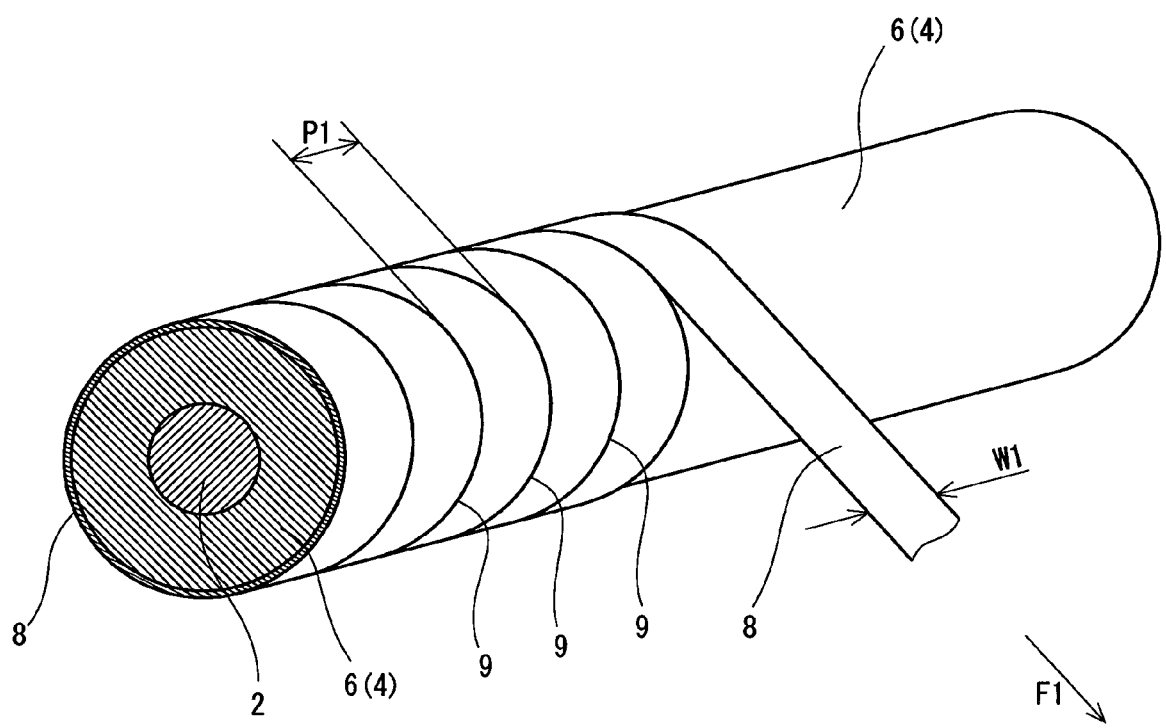
FIG. 2 is a partially sectional perspective view showing an example of a first winding step according to the present invention.
Figure 3:
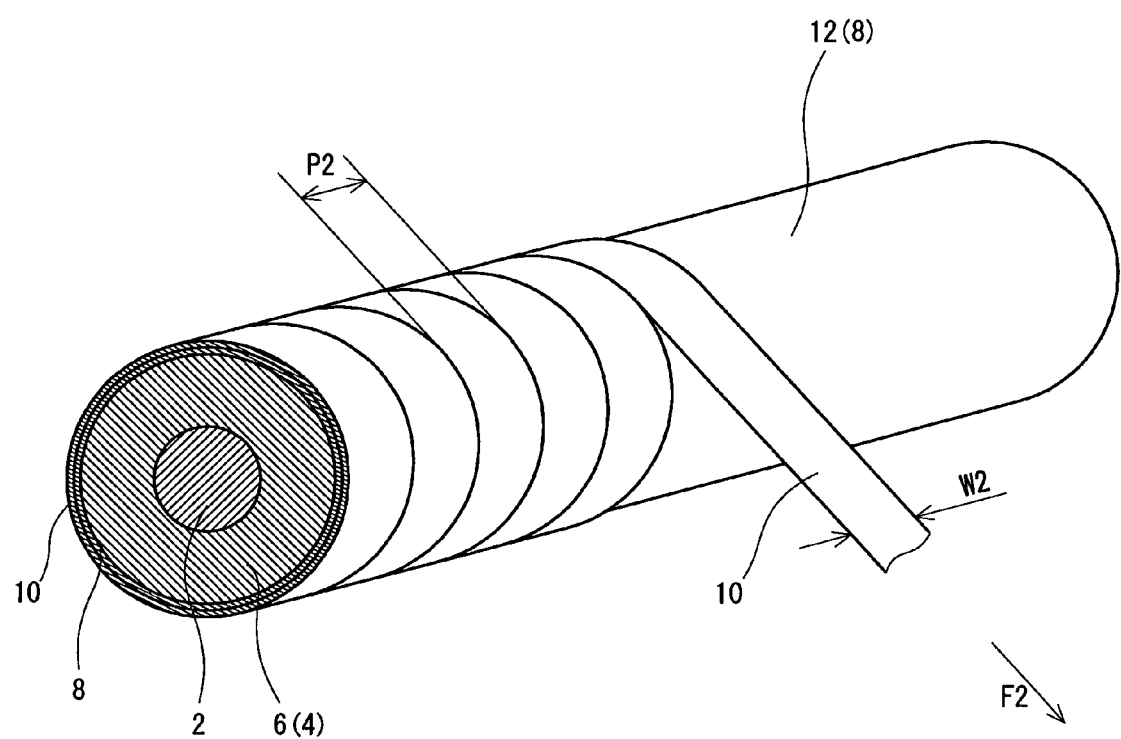
FIG. 3 is a partially sectional perspective view showing an example of a second winding step according to the present invention.

Next, a tape winding step is executed. At the tape winding step, a wrapping tape is wound around an outer peripheral surface of the intermediate formed body 6. FIGS. 2 and 3 are partially sectional perspective views showing a state of the tape winding step. In sections of FIGS. 2 and 3, the intermediate formed body 6 is schematically shown as a single layer. Actually, the intermediate formed body 6 is formed by a plurality of layers as described above.

At the tape winding step, two wrapping tapes 8 and 10 are used. The fabric tape 8 serves as a first wrapping tape. The resin film tape 10 serves as a second wrapping tape.

The tape winding step includes a first winding step and a second winding step. At the first winding step, the fabric tape 8 is used. In the fabric tape 8, a fabric is used as a base material. At the second winding step, the resin film tape 10 is used. In the resin film tape 10, a resin film is used as a base material. The second winding step is executed after the first winding step. A state of the first winding step is shown in FIG. 2. A state of the second winding step is shown in FIG. 3.

At the first winding step, the fabric tape 8 is directly wound around the outer peripheral surface of the intermediate formed body 6. The outer peripheral surface of the intermediate formed body 6 abuts on the fabric tape 8. The fabric tape 8 comes in contact with the outer peripheral surface of the intermediate formed body 6.

As shown in FIG. 2, the fabric tape 8 is wound spirally at the first winding step. In order to carry out the spiral winding, an axial direction of the intermediate formed body 6 is not perpendicular to a longitudinal direction of the fabric tape 8. The fabric tape 8 is wound around the intermediate formed body 6 without a gap. In order to eliminate the gap, a width W1 of the fabric tape 8 is greater than a winding pitch P1. The winding pitch P1 is shown in a double arrow in FIG. 2. In other words, the fabric tape 8 is wound spirally in a partial overlap in a transverse direction thereof. The fabric tape 8 is wound by means of a well-known wrapping machine. The fabric tape 8 is wound over a full length of the intermediate formed body 6. As a result of the first winding step, the whole intermediate formed body 6 is covered with the fabric tape 8. Both ends (a wind starting end and a wind terminating end) of the fabric tape 8 are fixed to the intermediate formed body 6 with an adhesive tape or the like. By fixing both of the ends, the fabric tape 8 can be prevented from being unwound spontaneously.

The fabric tape 8 is wound with an application of a tension F1. By the tension F1, the intermediate formed body 6 is fastened with the fabric tape 8. By winding the fabric tape 8, it is possible to obtain a fabric covered body 12. The fabric covered body 12 is obtained by covering the intermediate formed body 6 with the fabric tape 8.

At the second winding step, the resin film tape 10 is directly wound around an outer peripheral surface of the fabric covered body 12. The outer peripheral surface of the fabric covered body 12 abuts on the resin film tape 10. The resin film tape 10 comes in contact with the outer peripheral surface of the fabric covered body 12. In other words, the resin film tape 10 comes in contact with the fabric tape 8.

As shown in FIG. 3, the resin film tape 10 is wound spirally at the second winding step. In order to carry out the spiral winding, an axial direction of the fabric covered body 12 is not perpendicular to the longitudinal direction of the resin film tape 10. The resin film tape 10 is wound around the fabric covered body 12 without a gap. In order to eliminate the gap, a width W2 of the resin film tape 10 is greater than a winding pitch P2. The winding pitch P2 is shown in a double arrow in FIG. 3. In other words, the resin film tape 10 is wound spirally in a partial overlap in a transverse direction (width direction) thereof. The resin film tape 10 is wound by means of a well-known wrapping machine. The resin film tape 10 is wound over a full length of the fabric covered body 12. As a result of the second winding step, the whole fabric covered body 12 is covered with the resin film tape 10. Both ends (a wind starting end and a wind terminating end) of the resin film tape 10 are fixed to the fabric covered body 12 with an adhesive tape or the like. By fixing both of the ends, the resin film tape 10 can be prevented from being unwound spontaneously.

The resin film tape 10 is wound with an application of a tension F2. By the tension F2, the fabric covered body 12 is fastened with the resin film tape 10.

Through the first winding step and the second winding step described above, the intermediate formed body 6 is brought into a fastening state with the fabric tape 8 and the resin film tape 10.

Although a spiral pattern is formed on a surface of the fabric covered body 12 by the fabric tape 8, the spiral pattern formed by the fabric tape 8 is not shown in FIG. 3.

Next, a curing step is carried out. At the curing step, in the intermediate formed body 6 around which the fabric tape 8 and the resin film tape 10 are wound, the matrix resin is cured. The curing step indicates a heating step. Heating is carried out by a heating furnace. A heating temperature and a heating time are properly set depending on the specification of the matrix resin. It is preferable that the heating step (the curing step) should include a first stage for carrying out the heating at a predetermined temperature and a second stage for carrying out the heating at a higher temperature than that in the first stage. In the case in which an epoxy resin is used as the matrix resin, it is preferable that the heating step (the curing step) should include a first stage for carrying out the heating at a temperature of 60 to 115° C. for 10 to 120 minutes and a second stage for carrying out the heating at a temperature of 120 to 200° C. for 60 to 240 minutes after the first stage. Through the first stage, a viscosity of the resin is reduced so that a fluidity of the resin can be enhanced. Through the second stage, the curing operation for the epoxy resin can be advanced effectively.

By the heating in the first stage, the resin can flow easily so that the resin can readily be moved to the fabric tape. In order to prolong a flowing time for the resin, thereby increasing the movement of the resin to the fabric tape, the heating time in the first stage is more preferably equal to or longer than 15 minutes and is further preferably equal to or longer than 20 minutes. In order to prolong the flowing time for the resin, thereby increasing the movement of the resin to the fabric tape, the heating temperature in the first stage is more preferably equal to or lower than 100° C. and is further preferably equal to or lower than 90° C.

After the curing step, there is executed a step of pulling out the mandrel 2 and removing the wrapping tape to obtain a cured tubular body. For the removal of the wrapping tape, the resin film tape 10 is removed earlier and the fabric tape 8 is then removed. Either the pull-out of the mandrel 2 or the removal of the wrapping tape may be carried out earlier. In respect of a workability, it is preferable that the wrapping tape should be removed after the pull-out of the mandrel 2.

The cured tubular body is usually subjected to finishing so that a tubular body to be a final product is obtained. The finishing can include a work for cutting both ends, surface polishing, coating and the like.

Figure 4:
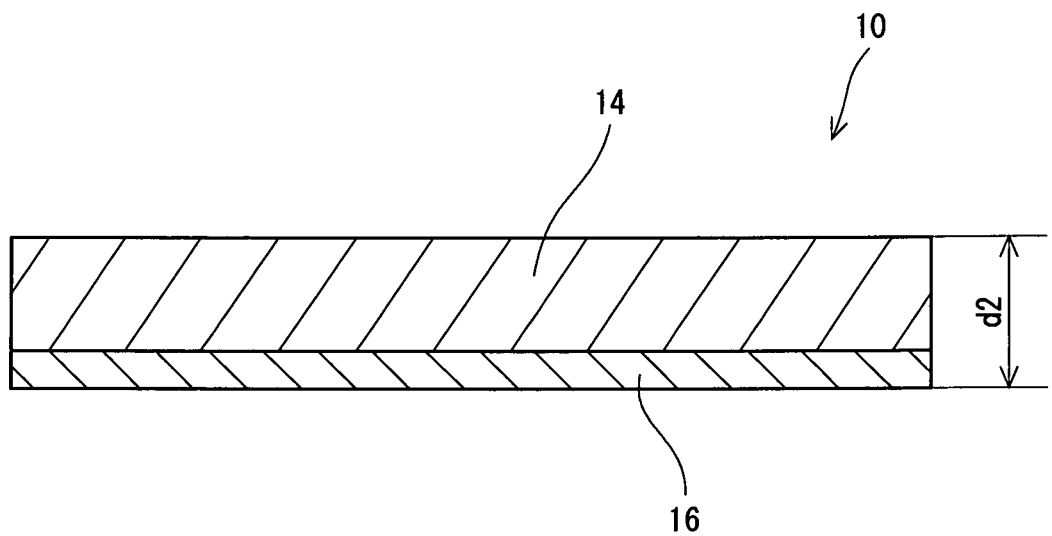
FIG. 4 is a sectional view showing a resin film tape.

FIG. 4 is a sectional view showing the resin film tape 10. The resin film tape 10 has a base material 14 constituted by a resin film and a coating agent 16. The resin film tape 10 has a two-layer structure including the base material 14 and the coating agent 16. The coating agent 16 is provided on an internal surface of the base material 14. For the coating agent 16, a fluorine type compound and a silicone type compound are preferred. In order to inhibit wrinkles generated on the fabric tape 8, the coating agent may be provided on an internal surface of the fabric tape 8.

As described above, in the present invention, the resin contained in the fiber reinforced resin member can be moved to the fabric tape 8 in the manufacturing process. The fabric tape 8 has a void or a hole between woven fibers. Accordingly, the fabric tape 8 can absorb and/or transmit the resin. By the fabric tape 8, the matrix resin can easily be discharged to an outside of a formed body so that a fiber content of the tubular body can be enhanced. Consequently, it is possible to achieve a reduction in a weight of the tubular body.

As means for increasing the fiber content of the FRP tubular body, it is possible to propose the use of a fiber reinforced resin member having a high fiber content. A high fiber content implies that a resin content is low. A fiber reinforced resin member having a low resin content has a low tacking property (adhesiveness). Accordingly, the fiber reinforced resin member having the low resin content has a low adherence of the fiber reinforced resin members. The fiber reinforced resin member having the low adhesiveness is apt to be unwound even if it is once wound around. In the fiber reinforced resin member having the low tacking property, a winding work over the mandrel 2 is hard to perform and wrinkles are easily generated in the winding work. Moreover, the adherence is poor. For this reason, air is apt to be contained between fiber reinforced resin member layers wound in whorls so that a strength and a durability of the tubular body are deteriorated. The fiber reinforced resin member having the low adhesiveness is apt to cause a reduction in a productivity and a forming failure.

In an initial stage for the heating work in the curing step, the resin (the matrix resin) in the fiber reinforced resin member is fluidized by heat. In this case, air contained in the fiber reinforced resin member or air (an air drift) present between laminated layers can be moved in and transmitted through the fluidized matrix resin and can be thus discharged to an outside. The fiber reinforced resin member having the low resin content has a small resin portion. For this reason, the movement and transmission of the air is hard to perform with the fluidization of the matrix resin.

In the tubular body using the fiber reinforced resin member having the high fiber content, thus, the air is apt to be contained due to a lowness in the tacking property, and Furthermore, the air discharge is hard to perform with the fluidization of the matrix resin. For this reason, a void is apt to remain in the tubular body which is formed so that a durability is reduced easily.

In the manufacturing method according to the present invention, the fabric tape 8 is directly wound around the outside of the intermediate formed body with an application of a tension, and Furthermore, the resin film tape 10 is wound around the outside thereof with an application of a tension. By the manufacturing method, the resin contained in the fiber reinforced resin member is absorbed into the fabric tape 8 during the heating step. By the absorption, it is possible to increase the fiber content of the FRP tubular body without using the fiber reinforced rein member having the high fiber content. Accordingly, the fiber reinforced resin member having the high tacking property can be used and the air can easily be discharged with the fluidization of the matrix resin. Furthermore, the fabric tape 8 can also absorb or transmit the air contained in the intermediate formed body 6. Consequently, the air causing the void can easily be discharged so that the strength of the FRP tubular body can be enhanced. By applying a high pressure to the intermediate formed body 6 through the resin film tape 10, moreover, it is possible to discharge the air causing the void more easily, thereby enhancing the strength of the FRP tubular body.

The resin is absorbed into the fabric tape 8 after the fiber reinforced resin member is wound therearound. In the present invention, it is possible to obtain an FRP tubular body having a high fiber content without using a fiber reinforced resin member having an excessively low adhesiveness. In other words, in the present invention, it is possible to easily wind the fiber reinforced resin member, achieving an enhancement in the fiber content. Since the fiber content is enhanced during the manufacturing process, it is possible to achieve a reduction in a weight while maintaining a forming property and a productivity.

In the present invention, the resin film tape 10 is wound around the outside of the fabric tape 8. The resin film tape 10 which substantially transmits neither the air nor the resin therethrough is wound around the outside of the fabric tape 8 so that the movement of the resin from the fiber reinforced resin member to the fabric tape 8 can be promoted still more. Moreover, the air contained in the intermediate formed body 6 can be moved to the fabric tape 8. Therefore, it is possible to obtain an FRP tubular body in which an air drift and a void are inhibited.

As described above, in the wrapping tape described in the JP-A-2002-144439, the fabric and the resin film are integrated with each other. Also in the tape, there is a possibility that a resin might be absorbed into a fabric portion. In the integrated tape, however, it has been found that a resin absorbing effect is actually poor.

The cause of the poor absorbing effect can be supposed as follows. A wrapping tape is wound spirally with parts in a transverse direction overlapping each other. Accordingly, an overlapping portion in which the wrapping tapes overlap each other is present in the wrapping tape wound spirally. In other words, the overlapping portion has an inner wrapping tape (an inner tape) coming in contact with the intermediate formed body and an outer wrapping tape (an outer tape) positioned on an outside of the inner tape. In case of a conventional integrated wrapping tape, a resin film layer present on the inner tape is provided between the outer tape and the intermediate formed body. The resin film layer transmits neither the resin nor the air therethrough. In case of the conventional integrated tape, accordingly, a resin film layer of the inner tape blocks the movement of the resin and the air to a fabric layer of the outer tape in the overlapping portion. In the conventional integrated tape, thus, the resin and the air are moved to the fabric layer with difficulty.

In the tape in which the fabric and the resin film are integrated with each other, furthermore, a void between the fabric and the resin film is decreased. For this reason, it is possible to suppose that the resin absorbing effect is poor. In the conventional integrated tape, moreover, a part of an adhesive layer present between the fabric and the resin film layer penetrates an inner part of the fabric and a void of the fabric itself is lessened. For this reason, it is possible to suppose that the resin absorbing effect is poor.

On the other hand, in the present invention, the fabric tapes overlap each other in the overlapping portion. In the overlapping portion, the resin tape layer is not present on the inside of the fabric tape. Accordingly, the resin and the air can be moved to the whole fabric tape including the overlapping portion. Thus, the resin and the air can easily be moved to the fabric tape.

In the present invention, furthermore, the fabric tape 8 and the resin film tape 10 are separate from each other, and both of them are wound separately. Therefore, a void between the fabric tape 8 and the resin film tape 10 can easily be increased. Consequently, the resin and the air can readily be moved to the fabric layer.

As described above, the fabric tape 8 is wound spirally with parts in a transverse direction overlapping each other. By the fabric tape 8 wound spirally, thus, concavo-convex portions are formed. A thickness of a portion in which the fabric tapes 8 overlap each other is a double of a thickness of a portion in which the fabric tapes 8 do not overlap each other. Accordingly, the concavo-convex portions are generated by the portion in which the fabric tapes 8 overlap each other and the portion in which the fabric tapes 8 do not overlap each other. Moreover, edges 9 in a transverse direction of the fabric tape 8 (see FIG. 2) make steps corresponding to the thickness of the fabric tape 8 and the steps serve as the concavo-convex portions. By the concavo-convex portions, the void between the fabric tape 8 and the resin film tape 10 is enlarged. The resin and the air can enter the void. Accordingly, the resin and the air can easily be moved to the fabric tape 8 side.

At the second winding step, the resin film tape 10 is wound around the fabric covered body 12 with an application of a tension F2. Due to the tension F2, wrinkles are generated on the fabric tape 8 having the resin film tape 10 wound therearound from an outside in some cases. The coating agent 16 can suppress the generation of the wrinkles. The coating agent 16 can reduce a frictional resistance between the fabric tape 8 and the resin film tape 10 in the second winding step. Because of the reduction in the frictional resistance, it is possible to suppress the generation of the wrinkles in the fabric tape 8. furthermore, the coating agent 16 gives a mold releasing property to the resin film tape 10. The mold releasing property can cause the resin film tape 10 to be easily removed.

As described above, the fabric tape 8 is wound with the application of the tension F1, and the resin film tape 10 is wound with the application of the tension F2. There are defined a tensile stress T1 to be applied to the fabric tape 8 at the first winding step and a tensile stress T2 to be applied to the resin film tape 10 at the second winding step. The tensile stress T1 is obtained by dividing the tension F1 by a sectional area S1 of the fabric tape 8. More specifically, [T1=F1/S1] is set. The sectional area S1 is measured in the fabric tape 8 in a state in which the tension does not act (a free state). The tensile stress T1 implies a tensile stress acting on the fabric tape 8 immediately before winding. The tensile stress T1 does not imply a tensile stress which acts on the fabric tape 8 in a winding state. The tensile stress T2 is obtained by dividing the tension F2 by a sectional area S2 of the resin film tape 10. More specifically, [T2=F2/S2] is set. The sectional area S2 is measured in the resin film tape 10 in a state in which the tension does not act (a free state). The tensile stress T2 implies a tensile stress acting on the resin film tape 10 immediately before winding. The tensile stress T2 does not imply a tensile stress which acts on the resin film tape 10 in a winding state.

In order to increase an amount of the resin to be moved to the fabric tape 8 and to suppress a slack of the fabric tape 8, the tensile stress T1 is preferably equal to or higher than 5 Mpa, is more preferably equal to or higher than 10 Mpa, is more preferably equal to or higher than 20 Mpa, is more preferably equal to or higher than 25 Mpa, and is further preferably equal to or higher than 30 Mpa. In order to suppress a step generated on a surface of the tubular body and to reduce a polishing amount for smoothing the surface of the tubular body, the tensile stress T1 is preferably equal to or lower than 150 Mpa, is more preferably equal to or lower than 100 Mpa, and is further preferably equal to or lower than 60 Mpa.

In order to increase the amount of the resin to be moved to the fabric tape 8, the tensile stress T2 is preferably equal to or higher than 40 Mpa, is more preferably equal to or higher than 50 Mpa, and is further preferably equal to or higher than 65 Mpa. In order to prevent the resin film tape 10 from being cut, the tensile stress T2 is preferably equal to or lower than 200 Mpa, is more preferably equal to or lower than 180 Mpa, and is more preferably equal to or lower than 150 Mpa.

It is preferable that the tensile stress T2 should be higher than the tensile stress T1. By setting T2>T1, it is possible to increase the amount of the resin to be moved to the fabric tape 8. By comparatively reducing the tensile stress T1, it is possible to easily maintain a void of the fabric tape 8. By comparatively increasing the tensile stress T2, it is possible to increase a fastening force against the intermediate formed body 6 while maintaining the void of the fabric tape 8. With T2>T1, therefore, the resin can easily be moved to the fabric tape 8. By setting T2>T1, moreover, it is possible to reduce the void in the FRP tubular body.

In order to suppress the generation of the wrinkles on the fabric tape 8 at the second winding step, a ratio (T1/T2) is preferably equal to or higher than 0.1, is more preferably equal to or higher than 0.2 and is further preferably equal to or higher than 0.4. In order to increase the resin to be moved to the fabric tape 8, the ratio (T1/T2) is preferably equal to or lower than 0.95, is more preferably equal to or lower than 0.9 and is further preferably equal to or lower than 0.8.

In the present invention, the fiber content of the intermediate formed body 6 is represented by Z1 (% by weight) and the fiber content of the cured tubular body is represented by Z2 (% by weight). In respect of a reduction in a weight, a difference (Z2−Z1) is preferably equal to or greater than 3% by weight, is more preferably equal to or greater than 4% by weight, is more preferably equal to or greater than 5% by weight, and is further preferably equal to or greater than 6% by weight. In the case in which the resin is excessively removed, the wrapping tape is removed with difficulty so that a productivity is apt to be reduced. From this viewpoint, the difference (Z2−Z1) is preferably equal to or smaller than 25% by weight, is more preferably equal to or smaller than 20% by weight, is more preferably equal to or smaller than 15% by weight, and is further preferably equal to or smaller than 10% by weight.

A manufacturing method for setting the difference (Z2−Z1) to be equal to or greater than 3% by weight and to be equal to or smaller than 25% by weight is not restricted to the manufacturing method including the first winding step and the second winding step. For the manufacturing method, a manufacturing method for winding only the fabric tape 8 at the winding step is illustrated. The manufacturing method is the same as the manufacturing method described above except that the second winding step is not included.

The fiber content Z1 of the intermediate formed body 6 is not restricted. In order to increase the rigidity and strength of the FRP tubular body, the fiber content Z1 is preferably equal to or higher than 50% by weight, is more preferably equal to or higher than 60% by weight, and is further preferably equal to or higher than 70% by weight. In order to enhance the productivity of the winding work and to suppress a winding failure, the fiber content Z1 is preferably equal to or lower than 85% by weight, is more preferably equal to or lower than 80% by weight, and is further preferably equal to or lower than 75% by weight. The fiber content Z1 of the intermediate formed body 6 is equal to the fiber content of the fiber reinforced resin member (the prepreg 4). The fiber content Z1 can be determined based on product data of the fiber reinforced resin member (the prepreg 4).

The fiber content Z2 of the cured tubular body is not restricted. In order to reduce the weight of the FRP tubular body, the fiber content Z2 is preferably equal to or higher than 60% by weight, is more preferably equal to or higher than 70% by weight, is more preferably equal to or higher than 75% by weight, and is further preferably equal to or higher than 80% by weight. In the case in which the resin is excessively removed, the wrapping tape is removed with difficulty due to the resin discharged from the intermediate formed body 6. For this reason, the productivity is apt to be reduced. From this viewpoint, the fiber content Z2 is preferably equal to or lower than 95% by weight, is more preferably equal to or lower than 90% by weight, is more preferably equal to or lower than 85% by weight, and is further preferably equal to or lower than 83% by weight. A value of the fiber content Z2 is calculated based on a value of the fiber content Z1, a weight of the intermediate formed body 6, and a weight of the removed resin.

In general consideration of a mold releasing property, a fastening force, a strength and the like, a nylon fiber and a polyester fiber is preferred for the fiber of the fabric tape 8. A thickness d1 of the fabric tape 8 is not restricted. In order to increase an amount of the resin absorbed by the fabric tape 8 and to increase a void between the fabric tape 8 and the resin film tape 10, the thickness d1 of the fabric tape 8 is preferably equal to or greater than 50 µm, is more preferably equal to or greater than 70 µm, and is further preferably equal to or greater than 90 µm. In order to suppress the generation of the wrinkles and to reduce a cost, the thickness d1 of the fabric tape 8 is preferably equal to or smaller than 150 µm, is more preferably equal to or smaller than 140 µm, and is further preferably equal to or smaller than 130 µm.

The width W1 of the fabric tape 8 is not restricted. In order to increase the amount of the resin which can be absorbed by the fabric tape 8, the width W1 of the fabric tape 8 is preferably equal to or greater than 5 mm, is more preferably equal to or greater than 7 mm, and is further preferably equal to or greater than 10 mm. In order to suppress the generation of the wrinkles and to easily fasten the intermediate formed body 6, the width W1 of the fabric tape 8 is preferably equal to or smaller than 35 mm, is more preferably equal to or smaller than 30 mm, and is further preferably equal to or smaller than 25 mm.

A texture of the fabric tape 8 is not restricted. Examples of the texture include a plain weave, a satin weave and a twill weave. When the fabric tape 8 is excessively stretched by a tension, the void that the resin can enter and the amount of the resin which can be absorbed into the fiber are apt to be decreased. In order to prevent the excessive stretch by the tension, it is preferable that the textile should have a yarn oriented in almost parallel with the longitudinal direction of the fabric tape 8.

Examples of a material of the base material 14 of the resin film tape 10 include a polypropylene resin and a polyester resin. These resins are preferable because of a great tensile strength. Furthermore, it is preferable to employ a resin film tape which contracts in a temperature region in which a viscosity of the resin in the fiber reinforced resin member is reduced. For example, it is preferable to employ a composite film obtained by laminating a polypropylene resin layer and a polyester resin layer.

A thickness d2 of the resin film tape 10 is not restricted. In order to prevent the resin film tape 10 from being cut by the tension F2, the thickness d2 of the resin film tape 10 is preferably equal to or greater than 10 µm, is more preferably equal to or greater than 15 µm, is more preferably equal to or greater than 20 µm, and is further preferably equal to or greater than 25 µm. In order to suppress the generation of the wrinkles and to reduce the cost, the thickness d2 of the resin film tape 10 is preferably equal to or smaller than 150 µm, is more preferably equal to or smaller than 120 µm, is more preferably equal to or smaller than 100 µm, and is further preferably equal to or smaller than 50 µm.

The width W2 of the resin film tape 10 is not restricted. In order to prevent the step from being generated on the surface of the tubular body, the width W2 is preferably equal to or greater than 10 mm, is more preferably equal to or greater than 12 mm, and is further preferably equal to or greater than 14 mm. In order to suppress the wrinkles in the winding, the width W2 is preferably equal to or smaller than 35 mm, is more preferably equal to or smaller than 30 mm, and is further preferably equal to or smaller than 25 mm.

The fiber of the fiber reinforced resin member is not restricted. Examples of the fiber include an inorganic fiber, an organic fiber and a metal fiber. Examples of the inorganic fiber include a carbon fiber, a glass fiber, a boron fiber, a silicon carbide fiber and an alumina fiber. Examples of the organic fiber include a polyethylene fiber and a polyamide fiber. Plural types of fibers may be combined. In order to obtain a tubular body having a small weight while maintaining a rigidity required for a golf club shaft, a tensile modulus of elasticity of a fiber is preferably equal to or higher than 5 t/mm$^2$, is more preferably equal to or higher than 10 t/mm$^2$, and is further preferably equal to or higher than 24 t/mm$^2$. In respect of an availability of the fiber, it is preferable that the tensile modulus of elasticity of the fiber should be equal to or lower than 100 t/mm$^2$. The tensile modulus of elasticity is measured in accordance with JIS R7601: 1986 "Carbon Fiber Testing Method".

With reference to FIGS. 5 to 8, next, description will be given to an embodiment in which a fabric tape and a rubber tape are used as wrapping tapes.

Figure 5:
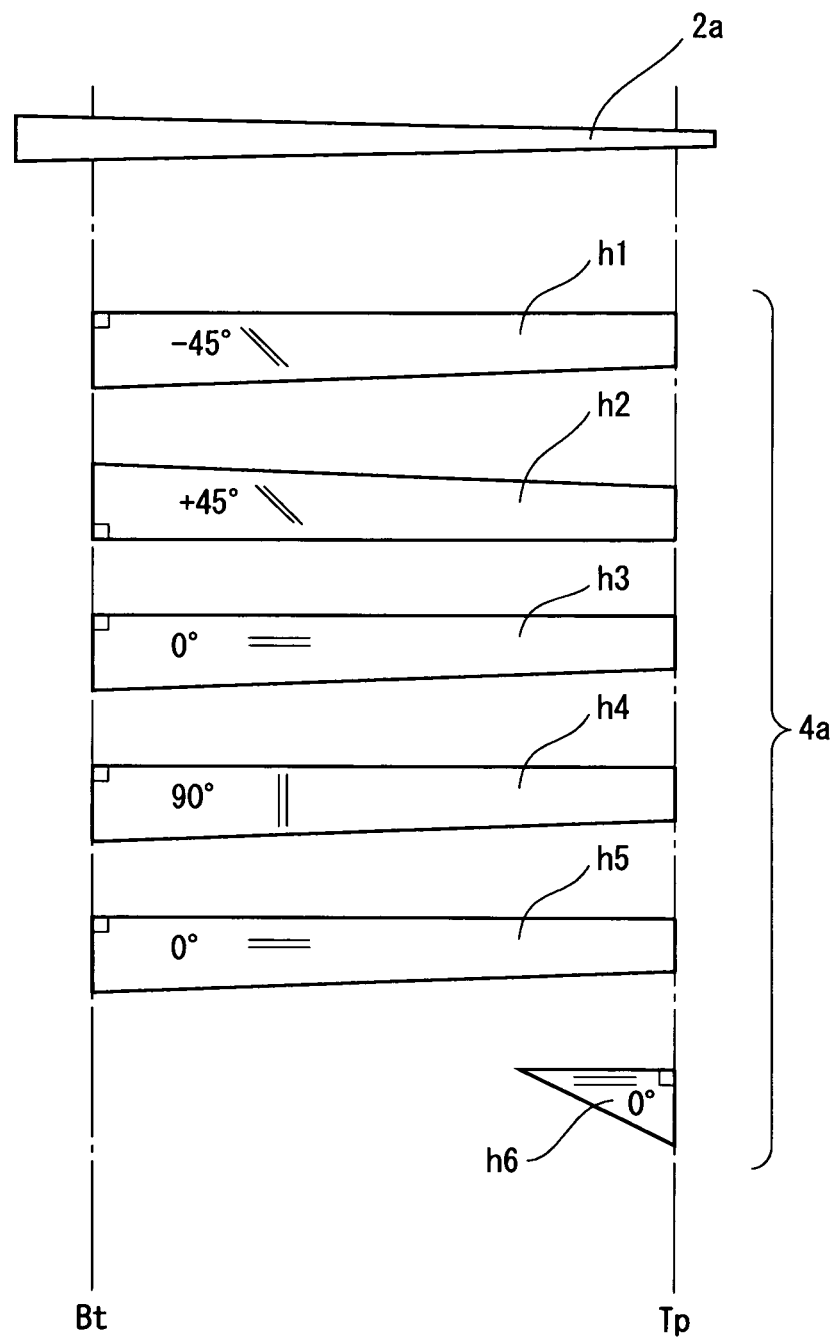
FIG. 5 is a view showing a mandrel and a prepreg which can be used in another embodiment according to the present invention.

In a manufacturing method according to the present invention which uses the fabric tape and the rubber tape, a tubular body formed by a fiber reinforced resin (an FRP tubular body) is obtained. FIG. 5 is a view for explaining a manufacturing method according to an embodiment of the present invention. As an example of a method of manufacturing the tubular body, description will be given to a method of manufacturing a golf club shaft. In the manufacturing method, first of all, a mandrel 2a and a fiber reinforced resin member 4a are prepared. The mandrel 2a is also referred to as a cored bar. A typical material of the mandrel 2a is a metal such as steel. A central axis of the mandrel 2a is an almost straight line. A sectional shape of the mandrel 2a is circular. The mandrel 2a has a taper. By the taper, the mandrel 2a becomes thinner toward one of ends thereof. The mandrel 2a may be partially parallel. In other words, the mandrel 2a may partially include a portion having a constant diameter. In the whole mandrel 2a, the diameter may be constant.

The mandrel 2a forms a hollow portion of the tubular body obtained finally. A shape of the hollow portion of the tubular body is determined depending on a shape of the mandrel 2a. As will be described below, the mandrel 2a is pulled out at a subsequent step. In order to easily carry out the pull-out, it is preferable that a surface of the mandrel 2a should be coated with a lubricant.

In the manufacturing method, first of all, a step of winding a fiber reinforced resin member around a mandrel is carried out.

Prior to the winding around step, the fiber reinforced resin member is prepared. In the present embodiment, the fiber reinforced resin member is sheet-shaped. In the present embodiment, the fiber reinforced resin member is a prepreg 4a. The manufacturing method in which the sheet-shaped fiber reinforced resin member is wound is also referred to as a sheet winding process. For the fiber reinforced resin member, a fiber impregnated with a liquid resin is illustrated in addition to the prepreg 4a. An example of a process using the fiber includes a so-called filament winding process. The manufacturing method can also be applied to the filament winding process.

The prepreg 4a includes a fiber and a matrix resin. The fiber is a carbon fiber. The carbon fiber of the prepreg 4a is oriented in one direction. As will be described below, fibers other than the carbon fiber may be employed. In order to obtain a tubular body having a high strength and a small weight, the carbon fiber is preferable. At the winding around step, the matrix resin is not completely cured. Accordingly, the prepreg 4a has a flexibility. The flexibility permits the wind of the prepreg 4a around the mandrel 2a. As will be described below, the matrix resin is not restricted but an epoxy resin is preferred.

Before the winding around step, the prepreg 4a is cut to have a desirable shape. In the embodiment shown in FIG. 5, six prepregs 4a are used. In the embodiment shown in FIG. 5, sheets h1 to h6 are shown as an example of the prepreg 4a which is cut. The prepreg 4a includes the sheets h1 to h2, the sheets h3, h5 and h6, and the sheet h4 for so-called angle, straight and hoop layers, respectively. The prepreg 4a includes the full length sheets h1 to h5 provided over a full length of the shaft and the partial sheet h6 provided in a part in a longitudinal direction of the shaft. The specification of the prepreg 4a is not restricted. A shape, a thickness, a fiber type, a fiber content and the like of the prepreg 4a are not restricted.

At the winding around step, the sheets h1 to h6 are sequentially wound around the mandrel 2a. Prior to the wind, the sheet h2 is laminated on the sheet h1. The sheet group thus laminated is wound around the mandrel 2a. In the lamination, the sheet h2 is turned over. By the turnover, a fiber of the sheet h1 and that of the sheet h2 are oriented in reverse directions to each other. In FIG. 5, angles described in the sheets h1 to h6 indicate an angle formed by an axial direction of the shaft and an orientation of the fiber.

The sheets h1 to h6 are wound manually, for example. A winding machine (which is also referred to as a rolling machine) may be used. An intermediate formed body 6a is obtained through the winding around step. The intermediate formed body 6a is constituted by the wound prepreg 4a. A section of the intermediate formed body 6a is formed by a whorl-like layer. The layer is formed by the prepreg 4a.

Figure 6:
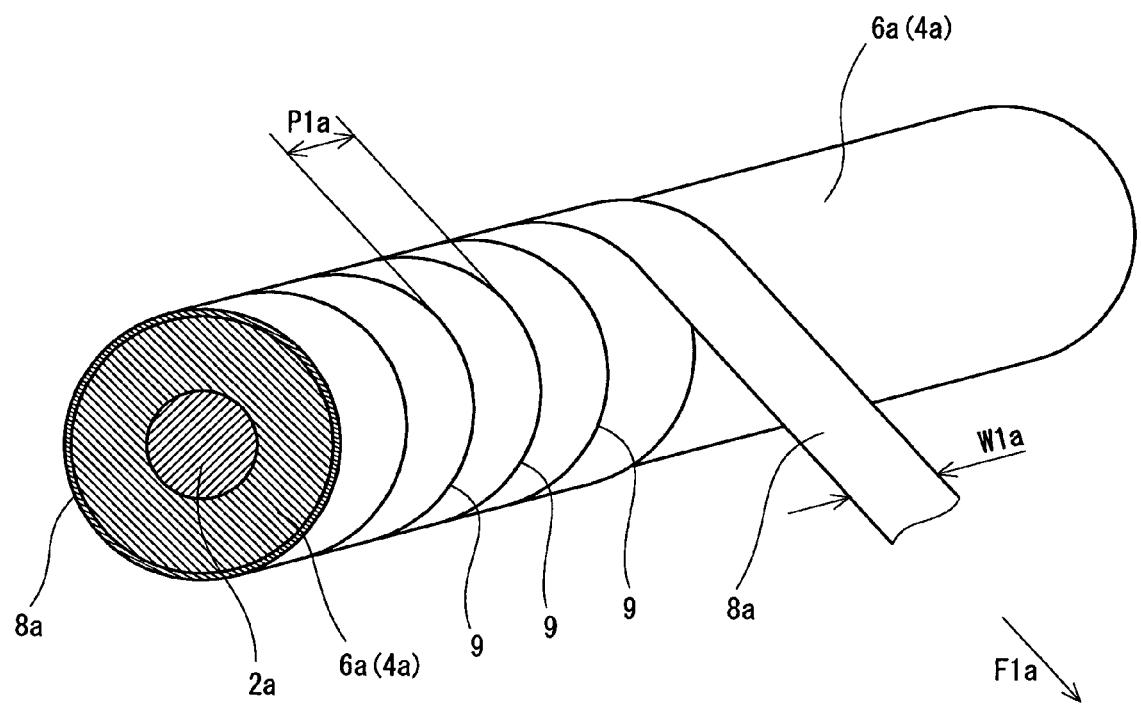
FIG. 6 is a partially sectional perspective view showing an example of a first winding step according to the present invention.
Figure 7:
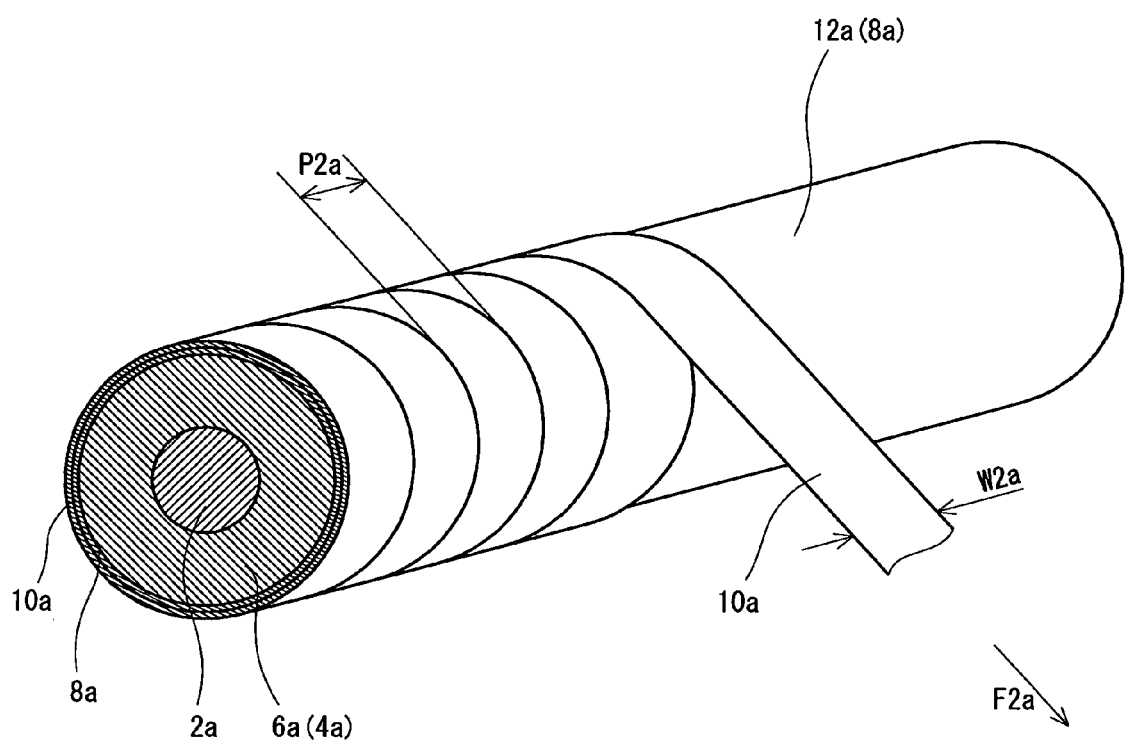
FIG. 7 is a partially sectional perspective view showing an example of a second winding step according to the present invention.

Next, a tape winding step is executed. At the tape winding step, a wrapping tape is wound around an outside of the intermediate formed body 6a. FIGS. 6 and 7 are partially sectional perspective views showing a state of the tape winding step. In sections of FIGS. 6 and 7, the intermediate formed body 6a is schematically shown as a single layer. Actually, the intermediate formed body 6a is formed by a plurality of layers as described above.

At the tape winding step, two wrapping tapes 8a and 10a are used. The fabric tape 8a serves as a first wrapping tape. The rubber tape 10a serves as a second wrapping tape.

The tape winding step includes a first winding step and a second winding step. At the first winding step, the fabric tape 8a is used. In the fabric tape 8a, a fabric is used as a base material. The fabric tape 8a may be constituted by only the fabric. At the second winding step, the rubber tape 10a is used. In the rubber tape 10a, a rubber or a rubber composition is used as a base material. The rubber tape 10a may be constituted by only the rubber composition. The second winding step is executed after the first winding step. A state of the first winding step is shown in FIG. 6. A state of the second winding step is shown in FIG. 7.

At the first winding step, the fabric tape 8a is directly wound around the outer peripheral surface of the intermediate formed body 6a. The outer peripheral surface of the intermediate formed body 6a abuts on the fabric tape 8a. The fabric tape 8a comes in contact with the outer peripheral surface of the intermediate formed body 6a.

As shown in FIG. 6, the fabric tape 8a is wound spirally at the first winding step. In order to carry out the spiral winding, an axial direction of the intermediate formed body 6a is not perpendicular to a longitudinal direction of the fabric tape 8a. The fabric tape 8a is wound around the intermediate formed body 6a without a gap. In order to eliminate the gap, a width W1a of the fabric tape 8a is greater than a winding pitch P1a. The winding pitch P1a is shown in a double arrow in FIG. 6. In other words, the fabric tape 8a is wound spirally in a partial overlap in a transverse direction thereof. The fabric tape 8a is wound by means of a well-known wrapping machine. The fabric tape 8a is wound over a full length of the intermediate formed body 6a. As a result of the first winding step, the whole intermediate formed body 6a is covered with the fabric tape 8a. Both ends (a wind starting end and a wind terminating end) of the fabric tape 8a are fixed to the intermediate formed body 6a with an adhesive tape or the like. By fixing both of the ends, the fabric tape 8a can be prevented from being unwound spontaneously.

The fabric tape 8a is wound with an application of a tension F1a. By the tension F1a, the intermediate formed body 6a is fastened with the fabric tape 8a. By winding the fabric tape 8a, it is possible to obtain a fabric covered body 12a. The fabric covered body 12a is obtained by covering the intermediate formed body 6a with the fabric tape 8a.

At the second winding step, the rubber tape 10a is wound around the outside of the intermediate formed body 6a. At the second winding step, the rubber tape 10a is directly wound around an outer peripheral surface of the fabric covered body 12a. The outer peripheral surface of the fabric covered body 12a abuts on the rubber tape 10a. The rubber tape 10a comes in contact with the outer peripheral surface of the fabric covered body 12a. In other words, the rubber tape 10a comes in contact with the fabric tape 8a.

As shown in FIG. 7, the rubber tape 10a is wound spirally at the second winding step. In order to carry out the spiral winding, an axial direction of the fabric covered body 12a is not perpendicular to the longitudinal direction of the rubber tape 10a. The rubber tape 10a is wound around the fabric covered body 12a without a gap. In order to eliminate the gap, a width W2a of the rubber tape 10a is greater than a winding pitch P2a. The winding pitch P2a is shown in a double arrow in FIG. 7. In other words, the rubber tape 10a is wound spirally in a partial overlap in a transverse direction thereof. The rubber tape 10a is wound by means of a well-known wrapping machine. The rubber tape 10a is wound over a full length of the fabric covered body 12a. As a result of the second winding step, the whole fabric covered body 12a is covered with the rubber tape 10a. Both ends (a wind starting end and a wind terminating end) of the rubber tape 10a are fixed to the fabric covered body 12a with an adhesive tape or the like. By fixing both of the ends, the rubber tape 10a can be prevented from being unwound spontaneously.

The rubber tape 10a is wound with an application of a tension F2a. By the tension F2a, the fabric covered body 12a is fastened with the rubber tape 10a.

Through the first winding step and the second winding step described above, the intermediate formed body 6a is brought into a fastening state with the fabric tape 8a and the rubber tape 10a.

Although a spiral pattern is formed on a surface of the fabric covered body 12a by the fabric tape 8a, the spiral pattern formed by the fabric tape 8a is not shown in FIG. 7.

Next, a curing step is carried out. At the curing step, in the intermediate formed body 6a around which the fabric tape 8a and the rubber tape 10a are wound, the matrix resin is cured. The curing step indicates a heating step. Heating is carried out by a heating furnace. A heating temperature and a heating time are properly set depending on the specification of the matrix resin. It is preferable that the heating step (the curing step) should include a first stage for carrying out the heating at a predetermined temperature and a second stage for carrying out the heating at a higher temperature than that in the first stage. In the case in which an epoxy resin is used as the matrix resin, it is preferable that the heating step (the curing step) should include a first stage for carrying out the heating at a temperature of 60 to 115° C. for 10 to 120 minutes and a second stage for carrying out the heating at a temperature of 120 to 200° C. for 60 to 240 minutes after the first stage. Through the first stage, a viscosity of the resin is reduced so that a fluidity of the resin can be enhanced. Through the second stage, the curing operation for the epoxy resin can be advanced effectively.

By the heating in the first stage, the resin can flow easily so that the resin can readily be moved to the fabric tape. In order to prolong a flowing time for the resin, thereby increasing the movement of the resin to the fabric tape, the heating time in the first stage is more preferably equal to or longer than 15 minutes and is further preferably equal to or longer than 20 minutes. In order to prolong the flowing time for the resin, thereby increasing the movement of the resin to the fabric tape, the heating temperature in the first stage is more preferably equal to or lower than 100° C. and is further preferably equal to or lower than 90° C.

After the curing step, there is executed a step of pulling out the mandrel 2a and removing the wrapping tape to obtain a cured tubular body. For the removal of the wrapping tape, the rubber tape 10a is removed earlier and the fabric tape 8a is then removed. Either the pull-out of the mandrel 2a or the removal of the wrapping tape may be carried out earlier. In respect of a workability, it is preferable that the wrapping tape should be removed after the pull-out of the mandrel 2a. A mark of the fabric tape 8a wound spirally remains as spiral concavo-convex portions on the surface of the cured tubular body.

The cured tubular body is usually subjected to finishing so that a tubular body to be a final product is obtained. The finishing can include a work for cutting both ends, surface polishing, coating and the like. By the surface polishing, the spiral concavo-convex portions are eliminated so that the surface can be smoothed.

Figure 8:
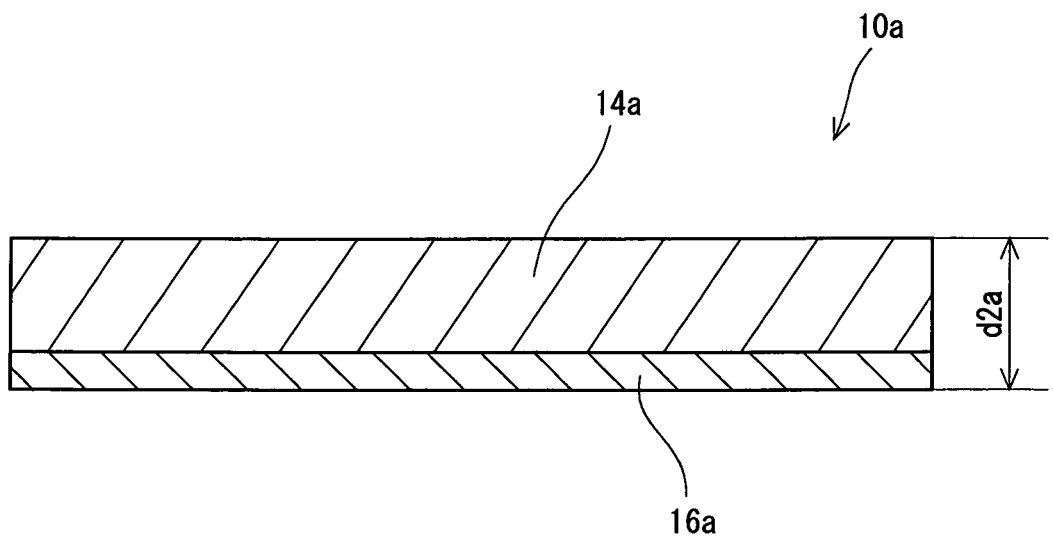
FIG. 8 is a sectional view showing a rubber tape.

FIG. 8 is a sectional view showing the rubber tape 10a. The rubber tape 10a has a base material 14a constituted by a rubber composition and a coating agent 16a. The rubber tape 10a has a two-layer structure including the base material 14a and the coating agent 16a. The coating agent 16a is provided on an internal surface of the base material 14a. For the coating agent 16a, a fluorine type compound and a silicone type compound are preferred. The coating agent 16a does not need to be provided. In order to inhibit wrinkles generated on the fabric tape 8a, moreover, the coating agent may be provided on an internal surface of the fabric tape 8a.

As described above, in the present invention, the resin contained in the fiber reinforced resin member can be moved to the fabric tape 8a in the manufacturing process. The fabric tape 8a has a void or a hole between woven fibers. Accordingly, the fabric tape 8a can absorb and/or transmit the resin. By the fabric tape 8a, the matrix resin can easily be discharged to an outside of a formed body so that a fiber content of the tubular body can be enhanced. Consequently, it is possible to achieve a reduction in a weight of the tubular body.

As means for increasing the fiber content of the FRP tubular body, it is possible to propose the use of a fiber reinforced resin member having a high fiber content. A high fiber content implies that a resin content is low. A fiber reinforced resin member having a low resin content has a low tacking property (adhesiveness). Accordingly, the fiber reinforced resin member having the low resin content has a low adherence of the fiber reinforced resin members. The fiber reinforced resin member having the low adhesiveness is apt to be unwound even if it is once wound around. In the fiber reinforced resin member having the low tacking property, a winding work over the mandrel 2a is hard to perform and wrinkles are easily generated in the winding work. Moreover, the adherence is poor. For this reason, air is apt to be contained between fiber reinforced resin member layers wound in whorls so that a strength and a durability of the tubular body are deteriorated. The fiber reinforced resin member having the low adhesiveness is apt to cause a reduction in a productivity and a forming failure.

In an initial stage for the heating work in the curing step, the resin (the matrix resin) in the fiber reinforced resin member is fluidized by heat. In this case, air contained in the fiber reinforced resin member or air (an air drift) present between laminated layers can be moved in and transmitted through the fluidized matrix resin and can be thus discharged to an outside. The fiber reinforced resin member having the low resin content has a small resin portion. For this reason, the movement and transmission of the air is hard to perform with the fluidization of the matrix resin.

In the tubular body using the fiber reinforced resin member having the high fiber content, thus, the air is apt to be contained due to a lowness in the tacking property, and furthermore, the air discharge is hard to perform with the fluidization of the matrix resin. For this reason, a void is apt to remain in the tubular body which is formed so that a durability is reduced easily.

In the manufacturing method according to the present invention, the fabric tape 8a is directly wound around the outside of the intermediate formed body with an application of a tension, and furthermore, the rubber tape 10a is wound around the outside thereof with an application of a tension. By the manufacturing method, the resin contained in the fiber reinforced resin member is absorbed into the fabric tape 8a during the heating step. By the absorption, it is possible to increase the fiber content of the FRP tubular body without using the fiber reinforced rein member having the high fiber content. Accordingly, the fiber reinforced resin member having the high tacking property can be used and the air can easily be discharged with the fluidization of the matrix resin. Furthermore, the fabric tape 8a can also absorb or transmit the air contained in the intermediate formed body 6a. Consequently, the air causing the void can easily be discharged so that the strength of the FRP tubular body can be enhanced. Since the rubber tape 10a is an elastic body, moreover, it is possible to effectively apply a pressure toward a center of the intermediate formed body 6a. By the pressure, it is possible to discharge the air causing the void more easily, thereby enhancing the strength of the FRP tubular body. Since the rubber tape 10a is wound in an elastic stretching state, it tries to contract. By a force for the contraction, the rubber tape 10a can effectively press the surface of the intermediate formed body 6a. By the pressing force, the air causing the void can be discharged further easily so that the strength of the FRP tubular body can be enhanced.

The resin is absorbed (extracted) through the fabric tape 8a after the fiber reinforced resin member is wound therearound. In the present invention, it is possible to obtain an FRP tubular body having a high fiber content without using a fiber reinforced resin member having an excessively low adhesiveness. In other words, in the present invention, it is possible to easily wind the fiber reinforced resin member, achieving an enhancement in the fiber content. Since the fiber content can be enhanced during the manufacturing process, it is possible to achieve a reduction in a weight while maintaining a forming property and a productivity.

In the present invention, the rubber tape 10a is wound around the outside of the fabric tape 8a. The rubber tape 10a which substantially transmits neither the air nor the resin therethrough is wound around the outside of the fabric tape 8a so that the movement of the resin from the fiber reinforced resin member to the fabric tape 8a can be promoted still more. Moreover, the air contained in the intermediate formed body 6a can be moved to the fabric tape 8a. Therefore, it is possible to obtain an FRP tubular body in which an air drift and a void are inhibited.

As described above, in the wrapping tape described in the JP-A-2002-144439, the fabric and the resin film are integrated with each other. Also in the tape, there is a possibility that a resin might be absorbed into a fabric portion. In the integrated tape, however, it has been found that a resin absorbing effect is actually poor.

The cause of the poor absorbing effect can be supposed as follows. A wrapping tape is wound spirally with parts in a transverse direction overlapping each other. Accordingly, an overlapping portion in which the wrapping tapes overlap each other is present in the wrapping tape wound spirally. In other words, the overlapping portion has an inner wrapping tape (an inner tape) coming in contact with the intermediate formed body and an outer wrapping tape (an outer tape) positioned on an outside of the inner tape. In case of a conventional integrated wrapping tape, a resin film layer present on the inner tape is provided between the outer tape and the intermediate formed body. The resin film layer transmits neither the resin nor the air therethrough. In case of the conventional integrated tape, accordingly, a resin film layer of the inner tape blocks the movement of the resin and the air to a fabric layer of the outer tape in the overlapping portion. In the conventional integrated tape, thus, the resin and the air are moved to the fabric layer with difficulty.

In the tape in which the fabric and the resin film are integrated with each other, Furthermore, a void between the fabric and the resin film is decreased. For this reason, it is possible to suppose that the resin absorbing effect is poor. In the conventional integrated tape, moreover, a part of an adhesive layer present between the fabric and the resin film layer penetrates an inner part of the fabric and a void of the fabric itself is lessened. For this reason, it is possible to suppose that the resin absorbing effect is poor.

On the other hand, in the present invention, the fabric tapes overlap each other in the overlapping portion. In the overlapping portion, the resin tape layer on the rubber tape layer is not present in the fabric tape. Accordingly, the resin and the air can be moved to the whole fabric tape including the overlapping portion. Thus, the resin and the air can easily be moved to the fabric tape.

In the present invention, furthermore, the fabric tape $8a$ and the rubber tape $10a$ are separate from each other, and both of them are wound separately. Therefore, a void between the fabric tape $8a$ and the rubber tape $10a$ can easily be increased. Consequently, the resin and the air can readily be moved to the fabric layer.

As described above, the fabric tape $8a$ is wound spirally with parts in a transverse direction overlapping each other. By the fabric tape $8a$ wound spirally, thus concavo-convex portions are formed. A thickness of a portion in which the fabric tapes $8a$ overlap each other is a double of a thickness of a portion in which the fabric tapes $8a$ do not overlap each other. Accordingly, the concavo-convex portions are generated by the portion in which the fabric tapes $8a$ overlap each other and the portion in which the fabric tapes $8$ do not overlap each other. Moreover, edges $9$ in a transverse direction of the fabric tape $8a$ (see FIG. 6) make steps corresponding to the thickness of the fabric tape $8a$ and the steps serve as the concavo-convex portions. By the concavo-convex portions, the void between the fabric tape $8a$ and the rubber tape $10a$ is enlarged. The resin and the air can enter the void. Accordingly, the resin and the air can easily be moved to the fabric tape $8a$ side.

At the second winding step, the rubber tape $10a$ is wound around the fabric covered body $12a$ with an application of a tension $F2a$. Due to the tension $F2a$, wrinkles are generated on the fabric tape $8a$ having the rubber tape $10a$ wound therearound from an outside in some cases. The coating agent $16a$ can suppress the generation of the wrinkles. The coating agent $16a$ can reduce a frictional resistance between the fabric tape $8a$ and the rubber tape $10a$ in the second winding step. Because of the reduction in the frictional resistance, it is possible to suppress the generation of the wrinkles in the fabric tape $8a$. Furthermore, the coating agent $16a$ gives a mold releasing property to the rubber tape $10a$. The mold releasing property can cause the rubber tape $10a$ to be easily removed.

As described above, the fabric tape $8a$ is wound with the application of the tension $F1a$, and the rubber tape $10a$ is wound with the application of the tension $F2a$. There are defined a tensile stress $T1a$ to be applied to the fabric tape $8a$ at the first winding step and a tensile stress $T2a$ to be applied to the rubber tape $10a$ at the second winding step. The tensile stress $T1a$ is obtained by dividing the tension $F1a$ by a sectional area $S1a$ of the fabric tape $8a$. More specifically, [$T1a=F1a/S1a$] is set. The sectional area $S1a$ is measured in the fabric tape $8a$ in a state in which the tension does not act (a free state). The tensile stress $T1a$ implies a tensile stress acting on the fabric tape $8a$ immediately before winding. The tensile stress $T1a$ does not imply a tensile stress which acts on the fabric tape $8a$ in a winding state. The tensile stress $T2a$ is obtained by dividing the tension $F2a$ by a sectional area $S2a$ of the rubber tape $10a$. More specifically, [$T2a=F2a/S2a$] is set. The sectional area $S2a$ is measured in the rubber tape $10a$ in a state in which the tension does not act (a free state). The tensile stress $T2a$ implies a tensile stress acting on the rubber tape $10a$ immediately before winding. The tensile stress $T2a$ does not imply a tensile stress which acts on the rubber tape $10a$ in a winding state.

In order to increase an amount of the resin to be moved to the fabric tape $8a$ and to suppress a slack of the fabric tape $8a$, the tensile stress $T1a$ is preferably equal to or higher than 5 Mpa, is more preferably equal to or higher than 10 Mpa, is more preferably equal to or higher than 20 Mpa, is more preferably equal to or higher than 25 Mpa, and is further preferably equal to or higher than 30 Mpa. In order to suppress a step generated on a surface of the tubular body and to reduce a polishing amount for smoothing the surface of the tubular body, the tensile stress $T1a$ is preferably equal to or lower than 150 Mpa, is more preferably equal to or lower than 100 Mpa, and is further preferably equal to or lower than 60 Mpa.

In order to increase the amount of the resin to be moved to the fabric tape $8a$, the tensile stress $T2a$ is preferably equal to or higher than 2 Mpa, is more preferably equal to or higher than 4 Mpa, and is further preferably equal to or higher than 6 Mpa. In order to prevent the rubber tape $10a$ from being cut, the tensile stress $T2a$ is preferably equal to or lower than 60 Mpa, is more preferably equal to or lower than 40 Mpa, is more preferably equal to or lower than 30 Mpa, and is further preferably equal to or lower than 20 Mpa.

In order to increase the amount of the resin to be moved to the fabric tape $8a$, it is preferable to increase a ratio ($T2a/T1a$). When the resin is moved to the fabric tape, an outside diameter of the intermediate formed body is reduced. When the outside diameter is reduced, a fastening force of the fabric tape $8a$ can be reduced. Even if the outside diameter is reduced, however, it is possible to effectively maintain a fastening force to be applied to the intermediate formed body by winding the rubber tape $10a$ having an elasticity from an outside thereof. By the fastening force of the rubber tape $10a$, the resin can easily be moved to the fabric tape $8a$. By the fastening force of the rubber tape $10a$, moreover, it is possible to reduce the void in the FRP tubular body.

When the ratio (T2a/T1a) is higher, the amount of the resin to be moved to the fabric tape 8a is increased. From this viewpoint, the ratio (T2a/Ta1) is preferably equal to or higher than 0.1 and is more preferably equal to or higher than 0.2. If the ratio (T2a/T1a) is excessively high, wrinkles or a damage of the rubber tape is apt to be generated. In this respect, the ratio (T2a/T1a) is preferably equal to or lower than 2.0 and is more preferably equal to or lower than 1.8.

In the case in which importance is attached to an increase in the resin to be moved to the fabric tape 8a, the ratio (T2a/T1a) is preferably set to be slightly higher, more specifically, the ratio (T2a/T1a) is preferably higher than 1.0, and furthermore, is preferably equal to or higher than 1.1 and is particularly suitably equal to or higher than 1.2. In this case, an upper limit of the ratio (T2a/T1a) is preferably equal to or lower than 2.0 and is more preferably equal to or lower than 1.8 in respect of a suppression in the generation of the wrinkles.

In the case in which importance is attached to the suppression in the generation of the wrinkles, moreover, the ratio (T2a/T1a) is preferably set to be slightly lower, more specifically, the ratio (T2a/T1a) is preferably lower than 1.0, is more preferably equal to or lower than 0.95 and is further preferably equal to or lower than 0.8. In this case, in order to maintain a predetermined amount of the resin to be moved to the fabric tape 8a, the ratio (T2a/T1a) is preferably equal to or higher than 0.1 and is more preferably equal to or higher than 0.2.

At the second winding step, in the case in which a resin film tape is used in place of the rubber tape, it is preferable that a tensile stress M2a of the resin film tape should be greater than the tensile stress T1a of the fabric tape. More specifically, M2a>T1a is preferable. The resin film tape has a lower elasticity than the rubber tape and has the tensile stress which is apt to be reduced when a temperature is raised to a shaft forming temperature. The reduction in the tensile stress causes a decrease in a pressing force through the resin film tape (a pressure applied toward an inside of the shaft) For this reason, in case of the resin film tape, it is preferable that M2a>T1a should be set to suppress the reduction in the tensile stress at the shaft forming temperature. On the other hand, also in the case in which the temperature of the rubber tape is raised to the shaft forming temperature due to the elasticity, a pressure to be applied to the shaft is rarely reduced. In case of the rubber tape, therefore, it is preferable that T2a<T1a should be set in order to effectively suppress drawbacks such as wrinkles. However, by setting T2a>T1a, it is possible to increase the amount of the resin to be moved to the fabric tape as described above.

In the present invention, a fiber content of the intermediate formed body 6a is represented by Z1 (% by weight) and a fiber content of the cured tubular body is represented by Z2 (% by weight). In respect of a reduction in a weight, a difference (Z2−Z1) is preferably equal to or greater than 3% by weight, is more preferably equal to or greater than 4% by weight, is more preferably equal to or greater than 5% by weight, and is further preferably equal to or greater than 6% by weight. In the case in which the resin is excessively removed, the wrapping tape is removed with difficulty so that a productivity is apt to be reduced. From this viewpoint, the difference (Z2−Z1) is preferably equal to or smaller than 25% by weight, is more preferably equal to or smaller than 20% by weight, is more preferably equal to or smaller than 15% by weight, and is further preferably equal to or smaller than 10% by weight.

A manufacturing method for setting the difference (Z2−Z1) to be equal to or greater than 3% by weight and to be equal to or smaller than 25% by weight is not restricted to the manufacturing method including the first winding step and the second winding step and other manufacturing methods can also be employed.

The fiber content Z1 of the intermediate formed body 6a is not restricted. In order to increase the rigidity and strength of the FRP tubular body, the fiber content Z1 is preferably equal to or higher than 50% by weight, is more preferably equal to or higher than 60% by weight, and is further preferably equal to or higher than 70% by weight. In order to enhance the productivity of the winding work and to suppress a winding failure, the fiber content Z1 is preferably equal to or lower than 85% by weight, is more preferably equal to or lower than 80% by weight, and is further preferably equal to or lower than 75% by weight. The fiber content Z1 of the intermediate formed body 6a is equal to the fiber content of the fiber reinforced resin member (the prepreg 4a). The fiber content Z1 can be determined based on product data of the fiber reinforced resin member (the prepreg 4a).

The fiber content Z2 of the cured tubular body is not restricted. In order to reduce the weight of the FRP tubular body, the fiber content Z2 is preferably equal to or higher than 60% by weight, is more preferably equal to or higher than 70% by weight, is more preferably equal to or higher than 75% by weight, and is further preferably equal to or higher than 80% by weight. In the case in which the resin is excessively removed, the wrapping tape is removed with difficulty due to the resin discharged from the intermediate formed body 6a. For this reason, the productivity is apt to be reduced. From this viewpoint, the fiber content Z2 is preferably equal to or lower than 95% by weight, is more preferably equal to or lower than 90% by weight, is more preferably equal to or lower than 85% by weight, and is further preferably equal to or lower than 83% by weight. A value of the fiber content Z2 is calculated based on a value of the fiber content Z1, a weight of the intermediate formed body 6a, and a weight of the removed resin.

In general consideration of a mold releasing property, a fastening force, a strength and the like, the fiber of the fabric tape 8a is preferably a nylon fiber and a polyester fiber. A thickness d1a of the fabric tape 8a is not restricted. In order to increase an amount of the resin absorbed by the fabric tape 8a and to increase a void between the fabric tape 8a and the resin film tape 10a, the thickness d1a of the fabric tape 8a is preferably equal to or greater than 50 μm, is more preferably equal to or greater than 70 μm, and is further preferably equal to or greater than 90 μm. In order to suppress the generation of the wrinkles preferably and to reduce a cost, the thickness d1a of the fabric tape 8a is preferably equal to or smaller than 150 μm, is more preferably equal to or smaller than 140 μm, and is further preferably equal to or smaller than 130 μm.

The width W1a of the fabric tape 8a is not restricted. In order to increase the amount of the resin which can be absorbed by the fabric tape 8a, the width W1a of the fabric tape 8a is preferably equal to or greater than 5 mm, is more preferably equal to or greater than 7 mm, and is further preferably equal to or greater than 10 mm. In order to suppress the generation of the wrinkles and to easily fasten the intermediate formed body 6a, the width W1a of the fabric tape 8a is preferably equal to or smaller than 35 mm, is more preferably equal to or smaller than 30 mm, and is further preferably equal to or smaller than 25 mm.

A texture of the fabric tape 8a is not restricted. Examples of the texture include a plain weave, a satin weave and a twill weave. When the fabric tape 8 is excessively stretched, the void that the resin can enter and the amount of the resin which can be absorbed into the fiber are apt to be decreased. In order to prevent the excessive stretch through a tension, it is preferable that the texture should have a yarn oriented in almost parallel with the longitudinal direction of the fabric tape 8a.

It is preferable that the base material 14a of the rubber tape 10a should be obtained by vulcanizing and forming a rubber composition. Examples of the base rubber of the rubber composition include at least one selected from a natural rubber (NR), an isoprene rubber (IR), a butadiene rubber (BR), a styrene-butadiene rubber (SBR), a chloroprene rubber (CR), an acrylonitrile-butadine rubber (NBR), a calboxylated nitrile rubber, a butyl rubber (IIR), a halogenated butyl rubber (X-IIR), an ethylene-propylene rubber (EPM), an ethylene-propylene-diene rubber (EPDM), an ethylene-polyvinyl acetate rubber (EVA), an acryl rubber (ACM, ANM), an ethylene-acryl rubber, chlorosulfonated polyethylene (CSM), polyethylene chloride (CM), an epichlorohydrin rubber (CO), an urethane type rubber, a silicone type rubber and a fluorine type rubber. Because of an excellent overall performance which generates takes a heat resistance, a durability, a tensile strength and a mold releasing property into consideration, it is preferable to employ a base rubber containing at least 50 parts by weight of the ethylene-propylene-diene rubber (EPDM), the butyl rubber (IIR) or the fluororubber for 100 parts by weight of the base rubber. The rubber composition preferably contains a vulcanizer and is preferably sulfur crosslinked. The rubber composition may contain vulcanization accelerators, crosslinking initiators, fillers, plasticizers, anti-aging agents and the like if necessary. As the vulcanization accelerators, it is possible to take at least one selected from thiazole type vulcanization accelerators, thiuram type vulcanization accelerators, guanidine type vulcanization accelerators and sulfenamide type vulcanization accelerators, for example. As the plasticizers, it is possible to take at least one selected from dioctyl phthalate, dibutyl phthalate, dioctyl sepacate, dioctyl adipate and tricresyl phosphate, for example. As the fillers, carbon black and silica can be taken as an example and they may be used together.

A thickness d2a of the rubber tape 10a is not restricted. In order to prevent the rubber tape 10a from being cut by the tension F2a and to suppress a twist of the rubber tape itself and the like, the thickness d2a of the rubber tape 10a is preferably equal to or greater than 300 µm, is more preferably equal to or greater than 400 µm, is more preferably equal to or greater than 500 µm, and is further preferably equal to or greater than 550 µm. In order to suppress an excessive step in a boundary between the outer tape and the inner tape which is generated in the winding with parts in the transverse direction of the rubber tape overlapping each other and to reduce the cost, the thickness d2a of the rubber tape 10a is preferably equal to or smaller than 2000 µm, is more preferably equal to or smaller than 1800 µm, is more preferably equal to or smaller than 1500 µm, and is further preferably equal to or smaller than 1200 µm.

The width W2a of the rubber tape 10a is not restricted. In order to prevent the rubber tape 10a from being cut by the tension F2a, the width W2a is preferably equal to or greater than 8 mm, is more preferably equal to or greater than 10 mm, and is further preferably equal to or greater than 12 mm. In order to suppress the wrinkles in the winding, the width W2a is preferably equal to or smaller than 35 mm, is more preferably equal to or smaller than 30 mm, and is further preferably equal to or smaller than 25 mm.

The fiber of the fiber reinforced resin member is not restricted. Examples of the fiber include an inorganic fiber, an organic fiber and a metal fiber. Examples of the inorganic fiber include a carbon fiber, a glass fiber, a boron fiber, a silicon carbide fiber and an alumina fiber. Examples of the organic fiber include a polyethylene fiber and a polyamide fiber. Plural types of fibers may be combined. In order to obtain a tubular body having a small weight while maintaining a rigidity required for a golf club shaft, a tensile modulus of elasticity of a fiber is preferably equal to or higher than 5 $t/mm^2$ (5000 $kg/mm^2$), is more preferably equal to or higher than 10 $t/mm^2$, and is further preferably equal to or higher than 24 $t/mm^2$. In respect of an availability of the fiber, it is preferable that the tensile modulus of elasticity of the fiber should be equal to or lower than 100 $t/mm^2$. The tensile modulus of elasticity is measured in accordance with JIS R7601: 1986 "Carbon Fiber Testing Method".

It is preferable that the tape winding step should include at least a step of winding the rubber tape as the wrapping tape. More preferably, the tape winding step includes the step of winding the fabric tape and the step of winding the rubber tape around the outside of the fabric tape in the same manner as in the embodiment described above. At the tape winding step, it is also possible to wind tapes other than the fabric tape and the rubber tape. In addition to the fabric tape and the rubber tape, it is also possible to wind the tapes other than the fabric tape and the rubber tape.

Figure 9:
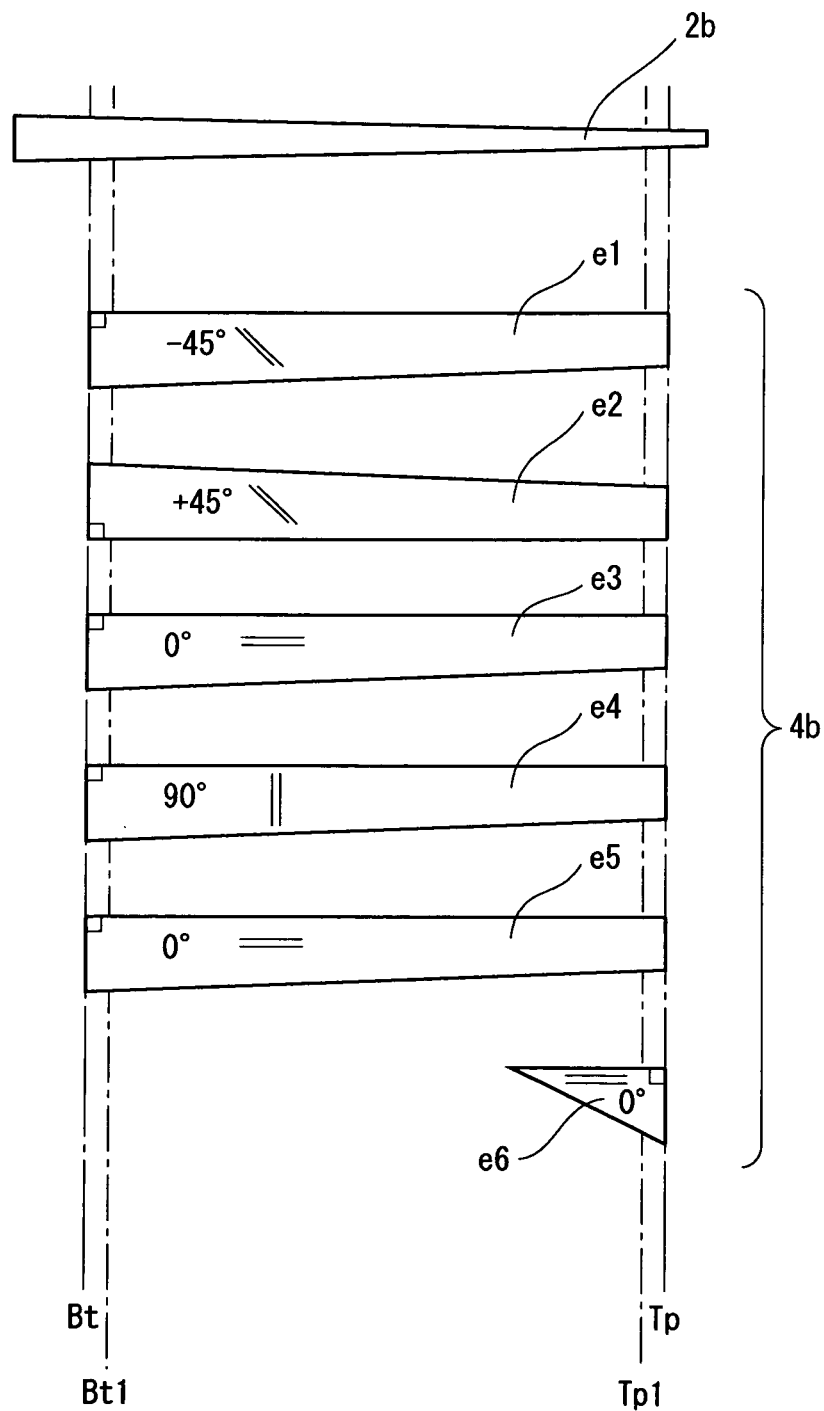
FIG. 9 is a view showing a mandrel and a prepreg which can be used in a further embodiment according to the present invention.
Figure 10:
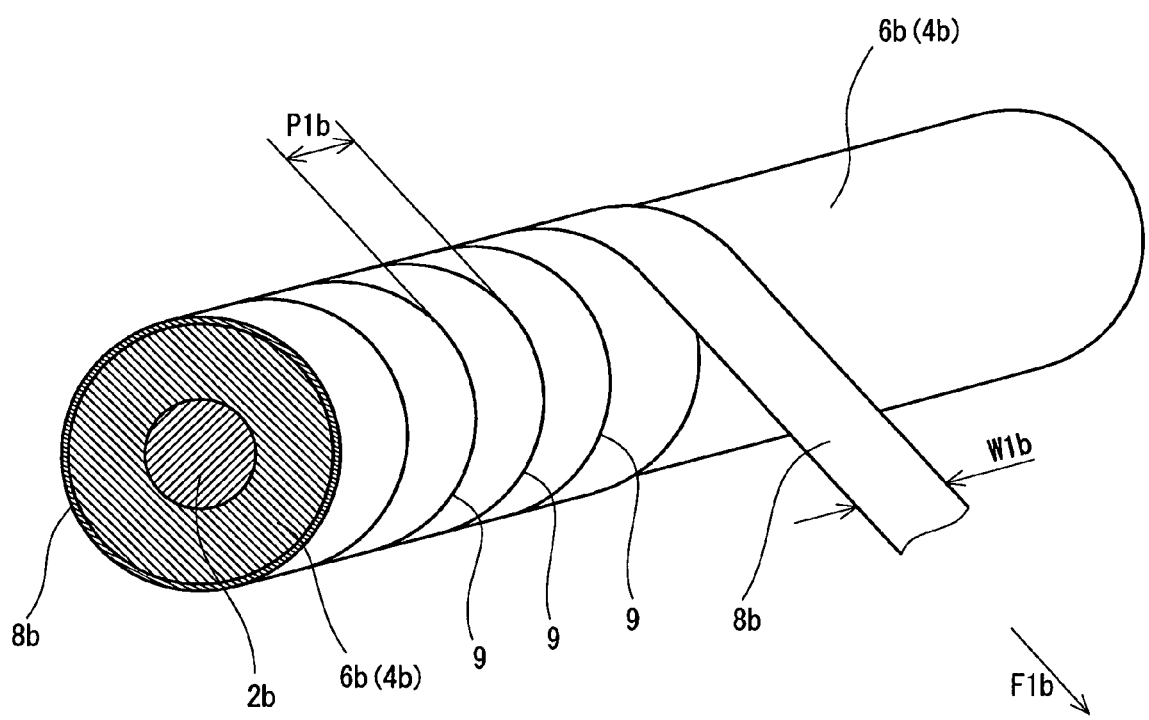
FIG. 10 is a partially sectional perspective view showing an example of a tape winding step according to the present invention.
Figure 11:
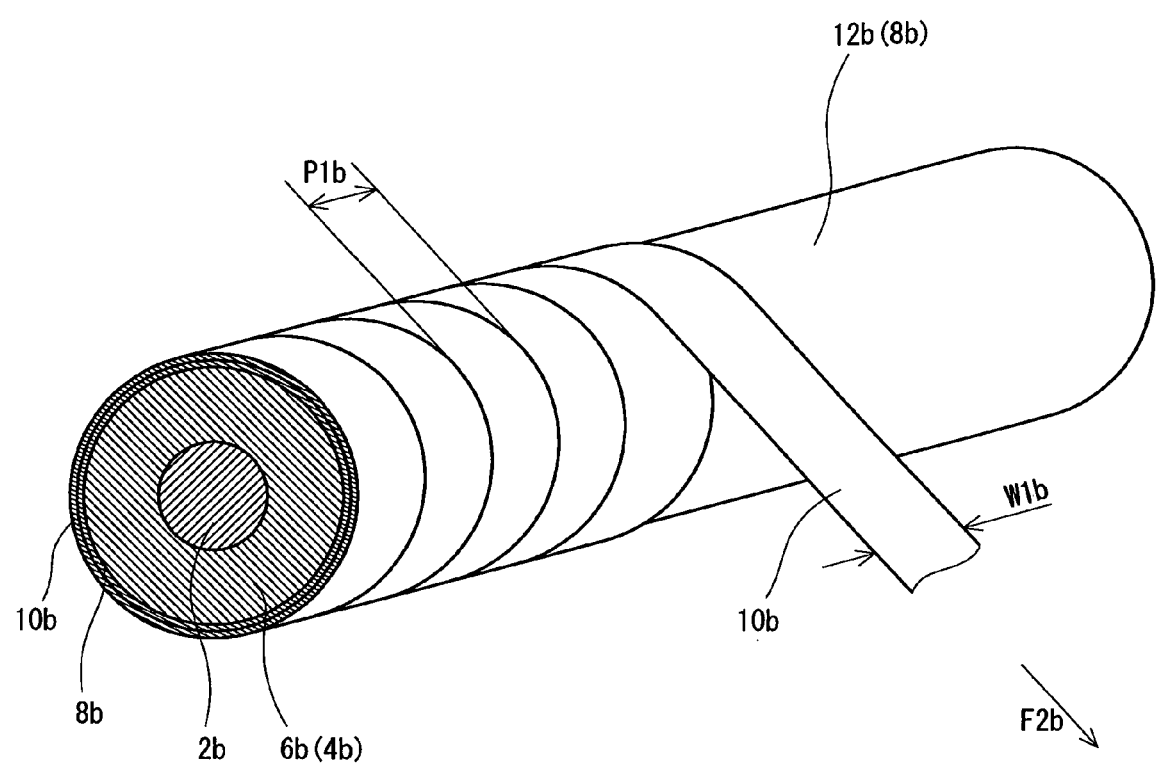
FIG. 11 is a partially sectional perspective view showing another example of the tape winding step according to the present invention.

With reference to FIGS. 9 to 11, next, description will be given to an embodiment in which only the fabric tape is used as the wrapping tape.

In a manufacturing method according to the present invention which uses only the fabric tape, a tubular body formed of a fiber reinforced resin (an FRP tubular body) is obtained. FIG. 9 is a view for explaining a manufacturing method according to an embodiment of the present invention. As an example of a method of manufacturing the tubular body, description will be given to a method of manufacturing a golf club shaft. In the manufacturing method, first of all, a mandrel 2b and a fiber reinforced resin member 4b are prepared. The mandrel 12b is also referred to as a cored bar. A typical material of the mandrel 2b is a metal such as steel. A central axis of the mandrel 2b is an almost straight line. A sectional shape of the mandrel 2b is circular. The mandrel 2b has a taper. By the taper, the mandrel 2b becomes thinner toward one of ends thereof. The mandrel 2b may be partially parallel. In other words, the mandrel 2b may partially include a portion having a constant diameter. In the whole mandrel 2b, the diameter may be constant.

The mandrel 2b forms a hollow portion of the tubular body obtained finally. A shape of the hollow portion of the tubular body is determined depending on a shape of the mandrel 2b. As will be described below, the mandrel 2b is pulled out at a subsequent step. In order to easily carry out the pull-out, it is preferable that a surface of the mandrel 2b should be coated with a lubricant.

In the manufacturing method, first of all, a step of winding a fiber reinforced resin member around a mandrel is carried out.

Prior to the winding around step, the fiber reinforced resin member is prepared. In the present embodiment, the fiber reinforced resin member is sheet-shaped. In the present embodiment, the fiber reinforced resin member is a prepreg 4b. The manufacturing method in which the sheet-shaped fiber reinforced resin member is wound is also referred to as a sheet winding process. For the fiber reinforced resin member, a fiber impregnated with a liquid resin is illustrated in addition to the prepreg 4b. An example of a process using the fiber includes a so-called filament winding process. The manufacturing method can also be applied to the filament winding process.

The prepreg 4b includes a fiber and a matrix resin. The fiber is a carbon fiber. The carbon fiber of the prepreg 4b is oriented in one direction. As will be described below, fibers other than the carbon fiber may be employed. In order to obtain a tubular body having a high strength and a small weight, the carbon fiber is preferable. At the winding around step, the matrix resin is not completely cured. Accordingly, the prepreg 4b has a flexibility. The flexibility permits the wind of the prepreg 4b around the mandrel 2b. As will be described below, the matrix resin is not restricted but an epoxy resin is preferred.

Before the winding around step, the prepreg 4b is cut to have a desirable shape. In the embodiment shown in FIG. 9, six prepregs 4b are used. In the embodiment shown in FIG. 9, sheets e1 to e6 are shown as an example of the prepreg 4b which is cut. The prepreg 4b includes the sheets e1 to e2, the sheets e3, e5 and e6, and the sheet e4 for so-called angle, straight and hoop layers, respectively. The prepreg 4b includes the full length sheets e1 to e5 provided over a full length of the shaft and the partial sheet e6 provided in a part in a longitudinal direction of the shaft. The specification of the prepreg 4b is not restricted. A shape, a thickness, a fiber type, a fiber content and the like of the prepreg 4b are not restricted.

At the winding around step, the sheets e1 to e6 are sequentially wound around the mandrel 2b. Prior to the wind, the sheet e2 is laminated on the sheet e1, which is not shown. The sheet group thus laminated is wound around the mandrel 2b. In the lamination, the sheet e2 is turned over. By the turnover, a fiber of the sheet e1 and that of the sheet e2 are oriented in reverse directions to each other. In FIG. 9, angles described in the sheets e1 to e6 indicates an angle formed by an axial direction of the shaft and an orientation of the fiber.

The sheets e1 to e6 are wound manually, for example. A winding machine (which is also referred to as a rolling machine) may be used. An intermediate formed body 6b is obtained through the winding around step. The intermediate formed body 6b is constituted by the wound prepreg 4b. A section of the intermediate formed body 6b is formed by a whorl-like layer. The layer is formed by the prepreg 4b.

Next, a tape winding step is executed. At the tape winding step, a wrapping tape is wound around an outer peripheral surface of the intermediate formed body 6b. FIGS. 10 and 11 are partially sectional perspective views showing a state of the tape winding step. In sections of FIGS. 10 and 11, the intermediate formed body 6b is schematically shown as a single layer. Actually, the intermediate formed body 6b is formed by a plurality of layers as described above. In the present application, the tape winding step is also referred to as a winding step.

The fabric tape 8b serves as the wrapping tape in the tape winding step. In the present embodiment, only the fabric tape is used as the wrapping tape. At the tape winding step, only the fabric tape 8b is wound. The fabric tape 8b uses a fabric as a base material. The fabric tape 8b may have a coating agent or the like on a surface of the base material of the fabric.

A state of the tape winding step is shown in FIG. 10. At the tape winding step, the fabric tape 8b is directly wound around the outer peripheral surface of the intermediate formed body 6b. The outer peripheral surface of the intermediate formed body 6b abuts on the fabric tape 8b. The fabric tape 8b comes in contact with the outer peripheral surface of the intermediate formed body 6b.

As shown in FIG. 10, the fabric tape 8b is wound spirally at the tape winding step. In order to carry out the spiral winding, an axial direction of the intermediate formed body 6b is not perpendicular to a longitudinal direction of the fabric tape 8b. The fabric tape 8b is wound around the intermediate formed body 6b without a gap. In order to eliminate the gap, a width W1b of the fabric tape 8b is greater than a winding pitch P1b. The winding pitch P1b is shown in a double arrow in FIG. 10. In other words, the fabric tape 8b is wound spirally in a partial overlap in a transverse direction thereof. The winding pitch P1b is constant. The winding pitch P1b is constant from a tip end to a butt end of the intermediate formed body 6b. The fabric tape 8b is wound by means of a well-known wrapping machine. The fabric tape 8b is wound over a full length of the intermediate formed body 6b. As a result of the tape winding step, the whole intermediate formed body 6b is covered with the fabric tape 8b. Both ends (a wind starting end and a wind terminating end) of the fabric tape 8b are fixed to the intermediate formed body 6b with an adhesive tape or the like. By fixing both of the ends, the fabric tape 8b can be prevented from being unwound spontaneously.

As will be described above, at subsequent steps, the resin contained in the intermediate formed body 6b is moved to the fabric tape 8b. More specifically, the resin contained in the intermediate formed body 6b is absorbed into the fabric tape 8b or is transmitted through the fabric tape 8b and is thus discharged to an outside.

In order to increase the amount of the resin to be absorbed into the fabric tape 8b, it is preferable that a large number L1 of wrapping layer of the fabric tape 8b should be provided. The number L1 of the wrapping layer indicates the number of layers of the fabric tape 8b wound around the intermediate formed body 6b. The number L1 of the wrapping layer is determined in each point on the surface of the intermediate formed body 6b. In the spiral winding, if the winding pitch P1b was greater than the width W1b of the fabric tape 8b, a portion in which the number L1 of the wrapping layer being zero and a portion in which the number L1 of the wrapping layer being one would be present in the intermediate formed body 6b after the winding step. If a ratio (P1b/W1b) is higher than 0.5 and is lower than 1.0, moreover, the portion in which the number L1 of the wrapping layer is one and a portion in which the number L1 of the wrapping layer is two are present in the intermediate formed body 6b after the winding step.

As a method for increasing the number L1 of the wrapping layer, it is possible to employ the following (Method A) and (Method B).

(Method A) The ratio (P1b/W1b) of the winding pitch P1b to the width W1b of the fabric tape is reduced.

(Method B) Winding is carried out at plural times.

Since the (Method A) can increase the number L1 of the wrapping layer in one winding operation, it can contribute to an enhancement in a productivity. On the other hand, since the (Method B) requires to repeat the winding from the tip side to the butt side and/or the winding from the tip side to the butt side, it has a poorer productivity as compared with the (Method A). In respect of the productivity, the (Method A) is preferable to the (Method B). Depending on a thickness, a flexibility or the like of the fabric tape 8b, a reduction in the ratio (P1b/W1b) to increase the number L1 of the wrapping layer has a limit in some cases. In these cases, the (Method B) can be used effectively.

In order to increase the number L1 of the wrapping layer, thereby enhancing the amount of absorption of the resin, the ratio (P1b/W1b) is preferably equal to or lower than 0.70, is more preferably equal to or lower than 0.50, is further preferably equal to or lower than 0.40, and is further preferably equal to or lower than 0.33. In the case in which the ratio (P1b/W1b) is excessively reduced and the number L1 of the wrapping layer is excessively increased, the amount of absorption of the resin is rarely increased and the productivity is reduced. From this viewpoint, the ratio (P1b/W1b) is preferably equal to or higher than 0.05, is more preferably equal to or higher than 0.07, and is further preferably equal to or higher than 0.10.

The fabric tape 8b is wound with an application of a tension F1b. By the tension F1b, the intermediate formed body 6b is fastened with the fabric tape 8b. By winding the fabric tape 8b, it is possible to obtain a fabric covered body 12b. The fabric covered body 12b is obtained by covering the intermediate formed body 6b with the fabric tape 8b.

FIG. 11 is a partially sectional perspective view showing a state of a second winding operation in the case in which the (Method B) is employed. In the second winding operation, the fabric tape 10b is directly wound around the outer peripheral surface of the fabric covered body 12b. The outer peripheral surface of the fabric covered body 12b abuts on the fabric tape 10b. The fabric tape 10b comes in contact with the outer peripheral surface of the fabric covered body 12b. In other words, the fabric tape 10b comes in contact with the fabric tape 8b. The fabric tape 8b and the fabric tape 10b may be identical to each other or different from each other.

As shown in FIG. 11, the fabric tape 10b is wound spirally in the second winding operation. The second winding operation can be carried out in the same manner as the first winding operation. As will be described below, in respect of the productivity, it is preferable that the second winding operation should not be executed.

The fabric tape 10b is wound with an application of a tension F2b. By the tension F2b, the fabric covered body 12b is fastened with the fabric tape 10b. The tensions F2b and F1b may be equal to each other or different from each other.

Although a spiral pattern is formed on a surface of the fabric covered body 12b by the fabric tape 8b, the spiral pattern formed by the fabric tape 8b is not shown in FIG. 11.

In the embodiment shown in FIG. 11, the fabric tape is wound from the tip end to the butt end. In the embodiment, the winding is repeated twice. By repeating the winding, thus, it is possible to regulate the number L1 of the wrapping layer, thereby adjusting the amount of absorption of the resin. In respect of the productivity, the number of the winding operations for winding the fabric tape in one direction (which will be hereinafter referred to as a winding number) is preferably equal to or smaller than three, is more preferably equal to or smaller than two and is particularly preferably one. The "one direction" may be set from the tip side toward the butt side or from the butt side toward the tip side.

After the winding step, a curing step is carried out. At the curing step, in the intermediate formed body 6b around which the fabric tape 8b is wound, the matrix resin is cured. The curing step indicates a heating step. Heating is carried out by a heating furnace. A heating temperature and a heating time are properly set depending on the specification of the matrix resin or the like. It is preferable that the heating step (the curing step) should include a first stage for carrying out the heating at a predetermined temperature and a second stage for carrying out the heating at a higher temperature than that in the first stage. In the case in which an epoxy resin is used as the matrix resin, it is preferable that the heating step (the curing step) should include a first stage for carrying out the heating at a temperature of 60 to 115° C. for 10 to 120 minutes and a second stage for carrying out the heating at a temperature of 120 to 200° C. for 60 to 240 minutes after the first stage. Through the first stage, a viscosity of the resin is reduced so that a fluidity of the resin can be enhanced. Through the second stage, the curing operation for the epoxy resin can be advanced effectively.

By the heating in the first stage, the resin can flow easily so that the resin can readily be moved to the fabric tape. In order to prolong a flowing time for the resin, thereby increasing the movement of the resin to the fabric tape, the heating time in the first stage is more preferably equal to or longer than 15 minutes and is further preferably equal to or longer than 20 minutes. In order to prolong the flowing time for the resin, thereby increasing the movement of the resin to the fabric tape, the heating temperature is more preferably equal to or lower than 100° C. and is further preferably equal to or lower than 90° C.

After the curing step, there is executed a step of pulling out the mandrel 2b and removing the fabric tape to obtain a cured tubular body. Either the pull-out of the mandrel 2b or the removal of the fabric tape may be carried out earlier. In respect of a workability, it is preferable that the fabric tape should be removed after the pull-out of the mandrel 2b.

The cured tubular body is usually subjected to finishing so that a tubular body to be a final product is obtained. The finishing can include a work for cutting both ends, surface polishing, coating and the like.

In order to prevent wrinkles from being generated on the fabric tape 8b, the coating agent may be provided on an internal surface of the fabric tape 8b. The internal surface of the fabric tape 8b indicates a surface abutting on the intermediate formed body 6b. For the coating agent, a fluorine type compound or a silicone type compound is preferred.

As described above, in the present invention, the resin contained in the fiber reinforced resin member can be moved to the fabric tape 8b in the manufacturing process. The fabric tape 8b has a void or a hole between woven fibers. Accordingly, the fabric tape 8b can absorb and/or transmit the resin. By the fabric tape 8b, the matrix resin can easily be discharged to an outside of a formed body so that a fiber content of the tubular body can be enhanced. Consequently, it is possible to achieve a reduction in a weight of the tubular body.

As means for increasing the fiber content of the FRP tubular body, it is possible to propose the use of a fiber reinforced resin member having a high fiber content. A high fiber content implies that a resin content is low. A fiber reinforced resin member having a low resin content has a low tacking property (adhesiveness). The reason is that the tacking property is caused by the resin. Accordingly, the fiber reinforced resin member having the low resin content has a low adherence of the fiber reinforced resin members. The fiber reinforced resin member having the low adhesiveness is apt to be unwound even if it is once wound around. In the fiber reinforced resin member having the low tacking property, a winding work over the mandrel 2b is hard to perform and wrinkles are easily generated in the winding work. Moreover, the adherence is poor. For this reason, air is apt to be contained between fiber reinforced resin member layers wound in whorls so that a strength and a durability of the tubular body are deteriorated. The fiber reinforced resin member having the low adhesiveness is apt to cause a reduction in a productivity and a forming failure.

In an initial stage for the heating work in the curing step, the resin (the matrix resin) in the fiber reinforced resin member is fluidized by heat. In this case, air contained in the fiber reinforced resin member or air (an air drift) present between laminated layers can be moved in and transmitted through the fluidized matrix resin and can be thus discharged to an outside. The fiber reinforced resin member having the low resin content has a small resin portion. For this reason, the movement and transmission of the air is hard to perform with the fluidization of the matrix resin.

In the tubular body using the fiber reinforced resin member having the high fiber content, thus, the air is apt to be contained due to a lowness in the tacking property, and furthermore, the air discharge is hard to perform with the fluidization of the matrix resin. For this reason, a void is apt to remain in the tubular body which is formed so that a durability is reduced easily.

In the manufacturing method according to the present invention, the fabric tape 8b is directly wound around the outside of the intermediate formed body with an application of a tension. By the manufacturing method, the resin contained in the fiber reinforced resin member is absorbed into the fabric tape 8b during the heating step. By the absorption, it is possible to increase the fiber content of the FRP tubular body without using the fiber reinforced rein member having the high fiber content. Accordingly, the fiber reinforced resin member having the high tacking property can be used and the air can easily be discharged with the fluidization of the matrix resin. Furthermore, the fabric tape 8b can also be caused to absorb or transmit the air contained in the intermediate formed body 6b. Consequently, the air causing the void can easily be discharged so that the strength of the FRP tubular body can be enhanced. Moreover, the number L1 of the wrapping layer is set to be two or more so that the fabric tape 8b can apply a high pressure to the intermediate formed body 6b. Therefore, the air causing the void can be discharged more easily so that the strength of the FRP tubular body can be enhanced.

The resin is absorbed through the fabric tape 8b after the fiber reinforced resin member is wound therearound. In the present invention, it is possible to obtain an FRP tubular body having a high fiber content without using a fiber reinforced resin member having an excessively low adhesiveness. In other words, in the present invention, it is possible to easily wind the fiber reinforced resin member, achieving an enhancement in the fiber content. Since the fiber content is enhanced during the manufacturing process, it is possible to achieve a reduction in a weight while maintaining a forming property and a productivity.

As described above, in the wrapping tape described in the JP-A-2002-144439, the fabric and the resin film are integrated with each other. Also in the tape, there is a possibility that a resin might be absorbed into a fabric portion. In the integrated tape, however, it has been found that a resin absorbing effect is actually poor.

The cause of the poor absorbing effect can be supposed as follows. A wrapping tape is wound spirally with parts in a transverse direction overlapping each other. Accordingly, an overlapping portion in which the wrapping tapes overlap each other is present in the wrapping tape wound spirally. In other words, the overlapping portion has an inner wrapping tape (an inner tape) coming in contact with the intermediate formed body and an outer wrapping tape (an outer tape) positioned on an outside of the inner tape. In case of a conventional integrated wrapping tape, a resin film layer present on the inner tape is provided between the outer tape and the intermediate formed body. The resin film layer transmits neither the resin nor the air therethrough. In case of the conventional integrated tape, accordingly, a resin film layer of the inner tape blocks the movement of the resin and the air to a fabric layer of the outer tape in the overlapping portion. In the conventional integrated tape, thus, the resin and the air are moved to the fabric layer with difficulty.

In the tape in which the fabric and the resin film are integrated with each other, furthermore, a void between the fabric and the resin film is decreased. For this reason, it is possible to suppose that the resin absorbing effect is poor. In the conventional integrated tape, moreover, a part of an adhesive layer present between the fabric and the resin film layer penetrates an inner part of the fabric and a void of the fabric itself is lessened. For this reason, it is possible to suppose that the resin absorbing effect is poor.

On the other hand, in the present invention, the fabric tapes overlap each other in the overlapping portion. In the overlapping portion, the resin tape layer is not present in the fabric tape. Accordingly, the resin and the air can be moved to the whole fabric tape including the overlapping portion. Thus, the resin and the air can easily be moved to the fabric tape.

In order to raise the pressure to be applied to the intermediate formed body 6b and to increase the amount of the resin absorbed into the fabric tape, an average number La of the wrapping layer is preferably equal to or larger than one, is more preferably equal to or larger than two, is more preferably equal to or larger than three, and is further preferably equal to or larger than five. In the case in which the average number La of the wrapping layer is excessively large, an increase in the cost of the fabric tape and an increase in a time and labor for peeling the fabric tape might be generated. In the case in which the average number La of the wrapping layer is excessively large, moreover, the wrinkles are easily generated on the surface of the intermediate formed body 6b. In these respects, the average number La of the wrapping layer is preferably equal to or smaller than 15, is more preferably equal to or smaller than 12 and is further preferably equal to or smaller than 10.

The average number La of the wrapping layer and the number L1 of the wrapping layer have different concepts from each other. It can be understood that the number L1 of the wrapping layer is determined in each point on the surface of the intermediate formed body 6b, while the average number La of the wrapping layer is an average value of the number L1 of the wrapping layer. Specifically, the average number La of the wrapping layer can be determined in accordance with the following equation (1).

$$La = St/Sn \tag{1}$$

In the Equation (1), St represents a total area (mm$^2$) of the internal surface of the fabric tape in a winding state and Sn represents a surface area (mm$^2$) of the intermediate formed body 6b in a portion coming in contact with the fabric tape which is wound. The total area St is a product of a length Nt (mm) of the fabric tape which is wound and a width Wa (mm) of the fabric tape. More specifically, St=Nt×Wa is set. The length Nt is measured in the longitudinal direction of the fabric tape. The length Nt is substantially equal to or greater than a length Nk of the fabric tape which is measured in an unwinding state from the intermediate formed body 6b. In the case in which Nt>Nk can be set, the fabric tape is wound in a stretching state with a tension. The width Wa is substantially equal to or smaller than the width W1b of the fabric tape which is measured in an unwinding state from the intermediate formed body 6b. In the case in which W1b>Wa can be set, the fabric tape is wound in the stretching state with the tension. Although the number L1 of the wrapping layer is an integer of 0, 1 or more, the average number La of the wrapping layer is not the integer in some cases.

For example, in the case in which the ratio (P1b/W1b) is 0.5, W1b=Wa is set and the winding number is one, the average number La of the wrapping layer is two. If an error of the winding pitch P1b is disregarded, moreover, the number L1 of the wrapping layer is two in all of the points.

The total area St and the surface area Sn are measured within a range from a tip end position Tp1 of the tubular body to a butt end position Bt1 of the tubular body. As described above, both of ends of the cured tubular body may be cut in the finishing step for the manufacture of the tubular body. In the case in which both of the ends are cut, the tip end position Tp1 of the tubular body is different from the tip end position Tp of the cured tubular body. In the case in which both of the ends are not cut, the tip end position Tp1 of the tubular body is coincident with the tip end position Tp of the cured tubular body. In the case in which both of the ends are cut, similarly, the butt end position Bt1 of the tubular body is different from a butt end position Bt of the cured tubular body. In the case in which neither of the ends are cut, the tip end position Tp1 of the tubular body is coincident with the tip end position Tp of the cured tubular body. FIG. 9 shows the tip end position Tp1 and the butt end position Bt1 in the case in which both of the ends are cut.

In order to raise the pressure to be applied to the intermediate formed body 6b and to increase the amount of the resin absorbed into the fabric tape, the number L1 of the wrapping layer is preferably equal to or larger than one, is more preferably equal to or larger than two, is more preferably equal to or larger than three, and is further preferably equal to or larger than five in all of the points from the tip end position Tp1 to the butt end position Bt1. In the case in which the number L1 of the wrapping layer is excessively large, an increase in the cost of the fabric tape and an increase in a time and labor for peeling the fabric tape might be generated. In the case in which the number L1 of the wrapping layer is excessively large, moreover, the wrinkles are easily generated on the surface of the intermediate formed body 6b. In these respects, the number L1 of the wrapping layer is preferably equal to or smaller than 15, is more preferably equal to or smaller than 12 and is further preferably equal to or smaller than 10 in all of the points from the tip end position Tp1 to the butt end position Bt1.

Irrespective of a value of the average number La of the wrapping layer, in the case in which the winding number is one, a portion in which the number L1 of the wrapping layer is one is present in both of ends of the winding portion. For example, also in the case in which the average number La of the wrapping layer is set to be two or more, the portion in which the number L1 of the wrapping layer is one is present in the wind starting portion and the wind terminating portion as long as the winding number is one. A portion Xt which is adjacent to the wind starting point and in which the number L1 of the wrapping layer is one has a tendency to have a smaller movement of the resin to the fabric tape as compared with the other portions. Accordingly, a tubular body (a shaft) obtained by cutting the portion Xt off is more preferable. Similarly, a portion Yt which is adjacent to the wind terminating point and in which the number L1 of the wrapping layer is one has a tendency to have a smaller movement of the resin to the fabric tape as compared with the other portions. Accordingly, a tubular body (a shaft) obtained by cutting the portion Yt off is more preferable. A portion having, on both sides in an axial direction, the portion in which the number L1 of the wrapping layer is two or more does not correspond to the portion Xt even if the number L1 of the wrapping layer is one. Similarly, a portion having, on the both sides in the axial direction, the portion in which the number L1 of the wrapping layer is two or more does not correspond to the portion Yt even if the number L1 of the wrapping layer is one. The axial direction implies an axial direction of the tubular body.

At the winding step, the fabric tape 8b may be reciprocatively wound between the tip side and the butt side. For example, the fabric tape 8b may be wound spirally from the butt side toward the tip side, and subsequently, the fabric tape 8b may be wound spirally from the tip side toward the butt side. By the winding operation of the reciprocating type, it is also possible to increase the winding number. In this specification, also in the case in which one reciprocative winding operation is carried out through the winding operation of the reciprocating type, it is defined that the winding number is two. Also in the case in which one reciprocative winding operation is carried out without cutting the fabric tape 8b in the middle, it is defined that the winding number is two. As described above, in respect of the productivity, a method of setting the winding number to be one and reducing the ratio (P1b/W1b) is preferred for a method of increasing the average number La of the wrapping layer.

As described above, the fabric tape 8b is wound with the application of the tension F1b. There is defined the tensile stress T1b to be applied to the fabric tape 8b at the first winding step. The tensile stress T1b is obtained by dividing the tension F1b by a sectional area Sd of the fabric tape 8b. More specifically, [T1b=F1b/Sd] is set. The sectional area Sd is measured in the fabric tape 8b in a state in which the tension does not act (a free state). The tensile stress T1b implies a tensile stress acting on the fabric tape 8b immediately before winding. The tensile stress T1b does not imply a tensile stress which acts on the fabric tape 8b in a winding state.

In order to increase an amount of the resin to be moved to the fabric tape 8b and to suppress a slack of the fabric tape 8b, the tensile stress T1b is preferably equal to or higher than 5 Mpa, is more preferably equal to or higher than 10 Mpa, is more preferably equal to or higher than 20 Mpa, is more preferably equal to or higher than 25 Mpa, and is further preferably equal to or higher than 30 Mpa. In order to suppress a step generated on a surface of the tubular body and to reduce a polishing amount for smoothing the surface of the tubular body, the tensile stress T1b is preferably equal to or lower than 150 Mpa, is more preferably equal to or lower than 100 Mpa, and is further preferably equal to or lower than 60 Mpa.

In the present invention, a fiber content of the intermediate formed body 6b is represented by Z1 (% by weight) and a fiber content of the cured tubular body is represented by Z2 (% by weight). In respect of a reduction in a weight, a difference (Z2−Z1) is preferably equal to or greater than 3% by weight, is more preferably equal to or greater than 4% by weight, is more preferably equal to or greater than 5% by weight, and is further preferably equal to or greater than 6% by weight. In the case in which the resin is excessively removed, the wrapping tape is removed with difficulty so that a productivity is apt to be reduced. From this viewpoint, the difference (Z2−Z1) is preferably equal to or smaller than 25% by weight, is more preferably equal to or smaller than 20% by weight, is more preferably equal to or smaller than 15% by weight, and is further preferably equal to or smaller than 10% by weight.

The fiber content Z1 of the intermediate formed body 6b b is not restricted. In order to increase the rigidity and strength of the FRP tubular body, the fiber content Z1 is preferably equal to or higher than 50% by weight, is more preferably equal to or greater than 60% by weight, and is further preferably equal to or greater than 70% by weight. In order to enhance the productivity of the winding work and to suppress a winding failure, the fiber content Z1 is preferably equal to or lower than 85% by weight, is more preferably equal to or lower than 80% by weight, and is further preferably equal to or lower than 75% by weight. The fiber content Z1 of the intermediate formed body 6b is equal to the fiber content of the fiber reinforced resin member (the prepreg 4b). The fiber content Z1 can be determined based on product data of the fiber reinforced resin member (the prepreg 4b).

The fiber content Z2 of the cured tubular body is not restricted. In order to reduce the weight of the FRP tubular body, the fiber content Z2 is preferably equal to or higher than 60% by weight, is more preferably equal to or greater than 70% by weight, is more preferably equal to or greater than 75% by weight, and is further preferably equal to or greater than 80% by weight. In the case in which the resin is excessively removed, the wrapping tape is removed with difficulty due to the resin discharged from the intermediate formed body 6b. For this reason, the productivity is apt to be reduced. From this viewpoint, the fiber content Z2 is preferably equal to or lower than 95% by weight, is more preferably equal to or lower than 90% by weight, is more preferably equal to or lower than 85% by weight, and is further preferably equal to or lower than 83% by weight. A value of the fiber content Z2 is calculated based on a value of the fiber content Z1, a weight of the intermediate formed body 6b, and a weight of the removed resin.

In general consideration of a mold releasing property, a fastening force, a strength and the like, the fiber of the fabric tape 8b is preferably a nylon fiber and a polyester fiber. A thickness d1b of the fabric tape 8b is not restricted. In order to increase an amount of the resin absorbed by the fabric tape 8b, the thickness d1b of the fabric tape 8b is preferably equal to or greater than 50 µm, is more preferably equal to or greater than 70 µm, and is further equal to or greater than 90 µm. In order to suppress the generation of the wrinkles and to reduce a cost, the thickness d1b of the fabric tape 8b is preferably equal to or smaller than 150 µm, is more preferably equal to or smaller than 140 µm, and is further preferably equal to or smaller than 130 µm.

In order to increase the amount of absorption of the resin, a product (La×d1b) of the average number La of the wrapping layer and the thickness d1b (µm) of the fabric tape 8b is preferably equal to or greater than 100, is more preferably equal to or greater than 200, is more preferably equal to or greater than 200, and is further preferably equal to or greater than 500. In respect of the productivity, the product (La×d1b) is preferably equal to or smaller than 10000, is more preferably equal to or smaller than 5000, is more preferably equal to or smaller than 1500, and is further preferably equal to or smaller than 1200.

The width W1b of the fabric tape 8b is not restricted. In order to enhance the productivity and to increase the amount of the resin which can be absorbed by the fabric tape 8b at the same time, the width W1b of the fabric tape 8b is preferably equal to or greater than 5 mm, is more preferably equal to or greater than 7 mm, and is further preferably equal to or greater than 10 mm. In order to suppress the generation of the wrinkles and to easily fasten the intermediate formed body 6b, the width W1b of the fabric tape 8b is preferably equal to or smaller than 35 mm, is more preferably equal to or smaller than 30 mm, and is further preferably equal to or smaller than 25 mm.

A texture of the fabric tape 8b is not restricted. Examples of the texture include a plain weave, a satin weave and a twill weave. When the fabric tape 8b is excessively stretched by the tension, the void that the resin can enter and the amount of the resin which can be absorbed into the fiber are apt to be decreased. In order to prevent the fabric tape 8b from being excessively stretched by the tension, it is preferable that the texture should have a yarn oriented in almost parallel with the longitudinal direction of the fabric tape 8b.

The fiber of the fiber reinforced resin member is not restricted. Examples of the fiber include an inorganic fiber, an organic fiber and a metal fiber. Examples of the inorganic fiber include a carbon fiber, a glass fiber, a boron fiber, a silicon carbide fiber and an alumina fiber. Examples of the organic fiber include a polyethylene fiber and a polyamide fiber. Plural types of fibers may be combined. In order to obtain a tubular body having a small weight while maintaining a rigidity required for a golf club shaft, a tensile modulus of elasticity of a fiber is preferably equal to or higher than 5 $t/mm^2$, is more preferably equal to or higher than 10 $t/mm^2$, and is further preferably equal to or higher than 24 $t/mm^2$. In respect of an availability of the fiber, it is preferable that the tensile modulus of elasticity of the fiber should be equal to or lower than 100 $t/mm^2$. The tensile modulus of elasticity is measured in accordance with JIS R7601: 1986 "Carbon Fiber Testing Method".

EXAMPLES

Although the advantages of the present invention will be apparent from examples, the present invention should not be construed restrictively based on description of the examples.

In examples 1 to 8, a fabric tape and a resin film tape are used. In examples 1a to 11a, the fabric tape and a rubber tape are used. In examples 1b to 7b, only the fabric tape is used.

First of all, description will be given to the examples in which the fabric tape and the resin film tape were used.
[Measurement of Forward Flex]

An upper side of a position placed apart from the butt end Bt of the cured tubular body by 75 mm and a lower side of a position placed apart from the butt end Bt by 215 mm were set to be support points. In a state in which these two points are supported, an axial direction of the cured tubular body was set to be horizontal. Next, a weight of 2.7 kg was applied to a load point K placed apart from the butt end Bt by 1039 mm. The cured tubular body was bent by the weight so that the load point K was moved downward. A moving amount in a vertical direction of the load point K is shown as a forward flex Fj in the following Table 2.
[Degree of Wrinkle]

A degree of a wrinkle generated on a surface of the cured tubular body was evaluated through a visual observation of an external appearance. The evaluation was carried out in the following five stages. The evaluation is shown in the following Table 2. When an evaluation point is smaller, a higher evaluation is obtained.
Evaluation 1: There is no wrinkle.
Evaluation 2: There is a wrinkle having a length which is equal to or greater than 1 mm and is smaller than 2 mm.
Evaluation 3: There is a wrinkle having a length which is equal to or greater than 2 mm and is smaller than 3 mm.
Evaluation 4: There is a wrinkle having a length which is equal to or greater than 3 mm and is smaller than 4 mm.
Evaluation 5: There is a wrinkle having a length which is equal to or greater than 4 mm.
[Thickness of Fabric Tape]

The thickness d1 of the fabric tape was measured by using a digimatic micrometer in accordance with the JIS L 1096. A constant pressure of 240 $g/cm^2$ was applied and the state was held for ten seconds, and the measurement was then carried out with the constant pressure of 240 $g/cm^2$ applied. The measurement was carried out in five places. An average value of data in the five places is shown as "Thickness d1" in the following Table 2.

Example 1

The mandrel shown in FIG. 1 was coated with a lubricant and six prepregs were then wound around the mandrel so that an intermediate formed body was obtained. Structures of the six prepregs are shown in FIG. 1. Types and structures of the prepregs of the sheets s1 to s6 are shown in the following Table 1. The sheets s1 to s6 are the prepregs manufactured by Toray Industries, Inc. "Tip Ply Number" in the Table 1 indicates the number of winds of the prepreg on the tip end Tp. "Fiber Angle" in the Table 1 indicates an orientation angle of a carbon fiber with respect to an axial direction of a shaft. In each of the prepregs, an epoxy resin is used for a matrix resin. An item number of each of the prepregs and a type (item number) of the carbon fiber are shown in the Table 1.

Next, there was executed a tape winding step of winding a wrapping tape around an outer peripheral surface of the intermediate formed body. The tape winding step was carried out by means of a wrapping machine manufactured by YOKOTE TEKKOSHO. For the tape winding step, a first winding step and a second winding step were carried out. The first winding step was carried out with an application of a certain tension F1. The second winding step was carried out with an application of a certain tension F2. The tensions F1 and F2 were measured by means of a load cell manufactured by NIDEC-SHIMPO CORPORATION. Tensile stresses T1 and T2 were calculated based on the tensions F1 and F2.

At the first winding step, a fabric tape was wound. For the fabric tape, "NYLON TAFFETA (trade name)" sold by KINKI TAPE CO., LTD. was used. The NYLON TAFFETA is a fabric tape obtained by weaving a nylon fiber through a plain weave. A type of nylon constituting the nylon fiber is Nylon 6. The fabric tape had a width W1 of 15 mm and a thickness d1 of 100 μm. The tensile stress T1 at the first winding step was set to be 10 Mpa. At the first winding step, a winding pitch P1 was set to be 2 mm.

After the first winding step, the second winding step was carried out. At the second winding step, a resin film tape was wound. For the resin film tape, a polypropylene (PP) film tape was used. For the PP film tape, PT30H manufactured by SHIN-ETSU FILM CO., LTD. was used. A silicone type coating agent is provided on a single side of the film tape. The PP film tape was wound with the coating agent layer set to an inside. The PP film tape had a width W2 of 25 mm and a thickness d2 of 30 μm. At the second winding step, a winding pitch P2 was set to be 2 mm.

After the second winding step, a curing step was carried out. At the curing step, heating was first executed at 80° C. for 30 minutes and the heating was then executed at 130° C. for 120 minutes.

Next, the mandrel was pulled out. Subsequently, the resin film tape and the fabric tape were removed so that a cured tubular body according to the example 1 was obtained.

In the example 1, a fiber content Z1 was 75% by weight. The fiber content Z1 indicates a fiber content of the intermediate formed body constituted by the sheets s1 to s6. The fiber content was calculated from a fiber content of the prepreg. A fiber content Z2 of the cured tubular body was calculated based on a weight Wt of the cured tubular body. Referring to the cured tubular body, a forward flex Fj was evaluated. The specification and evaluation result of the example 1 is shown in the following Table 2.

Examples 2 to 7

A cured tubular body according to each example was obtained in the same manner as in the example 1 except that the tensile stress T1 and/or the tensile stress T2 were/was changed as shown in the Table 2. The specification and evaluation result is shown in the following Table 2.

Example 8

A cured tubular body according to the present example was obtained in the same manner as in the example 1 except that the tape to be used at the second winding step was set to be a PET (polyethylene terephthalate) film and the tensile stress T1 and the tensile stress T2 were changed as shown in the Table 2. The specification and evaluation result of the PET film tape according to the present example is shown in the following Table 2. For the PET film tape, "PET-25K" manufactured by SHIN-ETSU FILM CO., LTD. was used. A silicone type coating agent is provided on a single side of the film tape. A resin film tape was wound with the coating agent layer set to an inside. The specification and evaluation result of the example 8 is shown in the following Table 2.

Comparative Example 1

At a tape winding step, a fabric tape was not wound but only a resin film tape was wound. For the resin film tape, the PP film tape utilized at the second winding step according to the example 1 was used. A tensile stress in the tape winding operation was set to be 60 Mpa. The others were the same as in the example 1 so that a cured tubular body according to a comparative example 1 was obtained. The specification and evaluation result of the comparative example 1 is shown in the following Table 2.

Comparative Example 2

At a tape winding step, a fabric tape was not wound but only a resin film tape was wound. For the resin film tape, the PET film tape utilized at the second winding step according to the example 8 was used. A tensile stress in the tape winding operation was set to be 60 Mpa. The others were the same as in the example 1 so that a cured tubular body according to a comparative example 2 was obtained. The specification and evaluation result of the comparative example 2 is shown in the following Table 2.

Comparative Example 3

At a tape winding step, neither a fabric tape nor a resin film tape were wound but an integrated tape was wound. The integrated tape was obtained by integrating NYLON TAFFETA having a width of 15 mm and a thickness of 100 μm and a PP film tape having a width of 15 mm and a thickness of 30 μm by heating and contact bonding. A tensile stress in the tape winding operation was set to be 60 Mpa. The others were the same as in the example 1 so that a cured tubular body according to a comparative example 3 was obtained. The specification and evaluation result of the comparative example 3 is shown in the following Table 2.

TABLE 1

Prepreg Type and Prepreg Structure in Example and Comparative Example

| Sheet | Tip Ply Number | Fiber Angle (degree) | Resin Type | Fiber Type | Item Number | Name of Company |
|---|---|---|---|---|---|---|
| s1 | 3 | −45 | Epoxy | M40S | 9255S-11 | Toray |
| s2 | 3 | 45 | Epoxy | M40S | 9255S-11 | Toray |
| s3 | 3 | 0 | Epoxy | T800G | 2255G-10 | Toray |
| s4 | 1 | 90 | Epoxy | M30S | 805S-3 | Toray |
| s5 | 2 | 0 | Epoxy | T800G | 2255G-10 | Toray |
| s6 | 4 | 0 | Epoxy | T800G | 2255G-10 | Toray |

TABLE 2

Specification and Evaluation Result in Example and Comparative Example

| | | Unit | Example 1 | Example 2 | Example 3 | Example 4 | Example 5 | Example 6 |
|---|---|---|---|---|---|---|---|---|
| First Winding Step | Tape Type | | Nylon Taffeta | Nylon Taffeta | Nylon Taffeta | Nylon Taffeta | Nylon Taffeta | Nylon Taffeta |
| | Width W1 | [mm] | 15 | 15 | 15 | 15 | 15 | 15 |
| | Thickness d1 | [μm] | 100 | 100 | 100 | 100 | 100 | 100 |
| | Tensile Stress T1 | [Mpa] | 10 | 20 | 35 | 40 | 54 | 57 |
| Second Winding Step | Tape Type | | PP | PP | PP | PP | PP | PP |
| | Width W2 | [mm] | 25 | 25 | 25 | 25 | 25 | 25 |
| | Thickness d2 | [μm] | 30 | 30 | 30 | 30 | 30 | 30 |
| | Tensile Stress T2 | [Mpa] | 100 | 100 | 85 | 80 | 66 | 63 |
| | T1/T2 | | 0.1 | 0.2 | 0.4 | 0.5 | 0.8 | 0.9 |
| | Degree of Wrinkle | | 3 | 2 | 1 | 1 | 1 | 1 |
| | Fiber Content Z1 | wt [%] | 75 | 75 | 75 | 75 | 75 | 75 |
| | Fiber Content Z2 | wt [%] | 83 | 83 | 83 | 82 | 81 | 80 |
| | Z2 − Z1 | wt [%] | 8 | 8 | 8 | 7 | 6 | 5 |
| | Weight of Cured Tubular Body (Wt) | [g] | 44 | 44 | 44 | 44 | 45 | 46 |
| | Forward Flex Fj | [mm] | 145 | 145 | 145 | 144 | 143 | 141 |
| | 1/(Fj × Wt) | | 0.000157 | 0.000157 | 0.000157 | 0.000158 | 0.000155 | 0.000154 |

| | | | Example 7 | Example 8 | Comparative Example 1 | Comparative Example 2 | Comparative Example 3 |
|---|---|---|---|---|---|---|---|
| First Winding Step | Tape Type | | Nylon Taffeta | Nylon Taffeta | PP | PET | Integrated Tape |
| | Width W1 | | 15 | 15 | 25 | 15 | 15 |
| | Thickness d1 | | 100 | 100 | 30 | 25 | 115 |
| | Tensile Stress T1 | | 60 | 40 | 60 | 60 | 60 |
| Second Winding Step | Tape Type | | PP | PET | — | — | — |
| | Width W2 | | 25 | 15 | — | — | — |
| | Thickness d2 | | 30 | 25 | — | — | — |
| | Tensile Stress T2 | | 60 | 80 | — | — | — |
| | T1/T2 | | 1.0 | 0.5 | — | — | — |
| | Degree of Wrinkle | | 1 | 1 | 1 | 1 | 3 |
| | Fiber Content Z1 | | 75 | 75 | 75 | 75 | 75 |
| | Fiber Content Z2 | | 79 | 82 | 75 | 75 | 77 |
| | Z2 − Z1 | | 4 | 7 | 0 | 0 | 2 |
| | Weight of Cured Tubular Body (Wt) | | 46 | 44 | 48 | 48 | 47 |
| | Forward Flex Fj | | 142 | 144 | 139 | 139 | 140 |
| | 1/(Fj × Wt) | | 0.000153 | 0.000158 | 0.000150 | 0.000150 | 0.000152 |

Integrated Tape: Wrapping Tape obtained by integrating Nylon Taffeta (Width 15 mm, Thickness 100 μm) and PP Tape (Width 15 mm, Thickness 30 μm) through Heating and Contact Bonding As shown in the Table 2, a difference (Z2−Z1) in each of the examples is greater than that in each of the comparative examples. In each of the examples, thus, a large amount of the resin is eliminated from the intermediate formed body in the manufacturing process.

In the examples, since an amount of decrease of the resin is large, an outside diameter of the cured tubular body is reduced. For this reason, the outside diameter in each of the examples is slightly smaller than the outside diameter in each of the comparative examples. Due to the difference between the outside diameters, the forward flex in each of the examples is greater than that in each of the comparative examples. Since a content of the fiber is equal in the examples and the comparative examples, a difference in the forward flex Fj is very small. A value [1/(Fj×Wt)] obtained by dividing an inverse number (1/Fj) of the forward flex Fj by the weight Wt of the cured tubular body in each of the examples is greater than that in each of the comparative examples. When the inverse number (1/Fj) of the forward flex Fj is greater, a rigidity of the cured tubular body is higher. An increase in [1/(Fj×Wt)] implies an enhancement in a rigidity per unit weight. The rigidity per unit weight in each of the examples is higher than that in each of the comparative examples.

In the examples 1 and 2, a ratio (T1/T2) is slightly low so that a small wrinkle was generated. In the example 6, the ratio (T1/T2) is slightly high so that the difference (Z2−Z1) is smaller than that in each of the examples 1 to 5. Since the ratio (T1/T2) in the example 7 is higher than that in the example 6, the difference (Z2−Z1) in the example 7 is smaller than that in the example 6.

In the comparative example 3, a torsion of the tape is generated at the tape winding step so that the wrinkle is generated on the cured tubular body due to the torsion.

In a golf club shaft, a head is attached to a tip portion. Therefore, a strength in the tip portion is particularly important. In the example 1 and the comparative example 1, a void fraction Rb in the tip portion of the shaft was measured. As a result, the void fraction Rb in the comparative example 1 was 0.8%, while the void fraction Rb in the example 1 was 0.4% which is 50% of the void fraction Rb in the comparative example 1. A void area Sb and a sectional area Sm of the shaft were calculated based on an image of a section on a point placed apart from the tip of the shaft by 90 mm and the void fraction Rb was thus calculated in accordance with the following equation.

$$Rb(\%) = (Sb/Sm) \times 100$$

Next, description will be given to examples in which a fabric tape and a rubber tape were used.

[Measurement of Forward Flex]

A forward flex Fj measured by the method is shown in the following Table 4.

[Degree of Wrinkle]

A result of an evaluation in five stages through the method is shown in the following Table 4.

[Thickness of Fabric Tape]

A thickness of the fabric tape which is obtained by the method is shown as "Thickness d1a" in the following Table 4.

Example 1a

The mandrel shown in FIG. 5 was coated with a lubricant and six prepregs were then wound around the mandrel so that an intermediate formed body was obtained. Structures of the six prepregs are shown in FIG. 5. Types and structures of the prepregs of the sheets h1 to h6 are shown in the following Table 3. The sheets h1 to h6 are the prepregs manufactured by Toray Industries, Inc. "Tip Ply Number" in the Table 3 indicates the number of winds of the prepreg on the tip end Tp. "Fiber Angle" in the Table 3 indicates an orientation angle of a carbon fiber with respect to an axial direction of a shaft. In each of the prepregs, an epoxy resin is used for a matrix resin. An item number of each of the prepregs and a type (item number) of the carbon fiber are shown in the Table 3.

Next, there was executed a tape winding step of winding a wrapping tape around an outside of the intermediate formed body. The tape winding step was carried out by means of a wrapping machine manufactured by YOKOTE TEKKOSHO. For the tape winding step, a first winding step and a second winding step were carried out. The first winding step was carried out with an application of a certain tension F1a. The second winding step was carried out with an application of a certain tension F2a. The tensions F1a and F2a were measured by means of a load cell manufactured by NIDEC-SIMPO CORPORATION. Tensile stresses T1a and T2a were calculated based on the tensions F1a and F2a.

At the first winding step, a fabric tape was wound. For the fabric tape, "NYLON TAFFETA (trade name)" sold by KINKI TAPE CO., LTD. was used. The NYLON TAFFETA is a fabric tape obtained by weaving a nylon fiber through a plain weave. A type of nylon constituting the nylon fiber is Nylon 6. The fabric tape had a width W1a of 15 mm and a thickness d1a of 100 μm. The tensile stress T1a at the first winding step was set to be 15 Mpa. At the first winding step, a winding pitch P1a was set to be 2 mm.

After the first winding step, the second winding step was carried out. At the second winding step, a rubber tape was wound. For the rubber tape, a rubber tape containing an EPDM rubber as a base rubber was used. The rubber tape is not provided with a coating agent. For the rubber tape, there was used a tape obtained by cutting "NEO ROOFING E" (trade name) manufactured by MITSUBOSHI BELTING LTD. to have the following width W2a. The width W2a of the rubber tape was set to be 12.5 mm and a thickness d2a of the rubber tape was set to be 1000 μm. At the second winding step, a winding pitch P2a was set to be 5 mm.

After the second winding step, a curing step was carried out. At the curing step, heating was first executed at 80° C. for 30 minutes and the heating was then executed at 130° C. for 120 minutes.

Next, the mandrel was pulled out. Subsequently, the rubber tape and the fabric tape were removed so that a cured tubular body according to the example 1a was obtained.

In the example 1a, a fiber content Z1 was 75% by weight. The fiber content Z1 indicates a fiber content of the intermediate formed body constituted by the sheets h1 to h6. The fiber content was calculated from a fiber content of the prepreg. A fiber content Z2 of the cured tubular body was calculated based on a weight Wt of the cured tubular body. Referring to the cured tubular body, a forward flex Fj was evaluated. The specification and evaluation result of the example 1a is shown in the following Table 4.

Examples 2a to 7a

A cured tubular body according to each example was obtained in the same manner as in the example 1a except that the tensile stress T1a and/or the tensile stress T2a were/was changed as shown in the Table 4. The specification and evaluation result is shown in the following Table 4.

Example 8a

A cured tubular body according to the present example was obtained in the same manner as in the example 1a except that the tape to be used at the second winding step was set to be a butyl rubber tape and the tensile stress T1a and the tensile stress T2a were changed as shown in the Table 4. The butyl rubber tape is constituted by a rubber composition containing a butyl rubber as a base rubber. The specification and evaluation result of the butyl rubber tape is shown in the following Table 4. A tape obtained by cutting "BUTYL RUBBER SHEET" (trade name) manufactured by SK CO., LTD. to have the width W2a of 25 mm was used for the butyl rubber tape. The specification and evaluation result of the example 8a is shown in the following Table 4.

Examples 9a to 11a

A cured tubular body according to each of examples was obtained in the same manner as in the example 1a except that the tensile stress T1a and the tensile stress T2a were set as shown in the Table 4. The specification and evaluation result is shown in the following Table 4.

Comparative Example 1a

At a tape winding step, a fabric tape was not wound but a resin film tape was wound. Only a polypropylene (PP) film tape was used for the resin film tape. "PT-30H" (trade name) manufactured by SHIN-ETSU FILM CO., LTD. was used for the PP film tape. A tensile stress in the tape winding operation was set to be 60 Mpa. The others were the same as in the example 1a so that a cured tubular body according to a comparative example 1a was obtained. The specification and evaluation result of the comparative example 1a is shown in the following Table 4.

Comparative Example 2a

At a tape winding step, a fabric tape was not wound but a resin film tape was wound. The PET film tape was used for the resin film tape. "PET-25K" (trade name) manufactured by SHIN-ETSU FILM CO., LTD. was used for the PET film tape. A tensile stress in the tape winding operation was set to be 60 Mpa. The others were the same as in the example 1a so that a cured tubular body according to a comparative example 2a was obtained. The specification and evaluation result of the comparative example 2a is shown in the following Table 4.

Comparative Example 3a

At a tape winding step, neither a fabric tape nor a rubber tape were wound and a resin film tape was not wound but only an integrated tape was wound. The integrated tape was obtained by integrating NYLON TAFFETA having a width of 15 mm and a thickness of 100 μm and a PP film tape having a width of 15 mm and a thickness of 30 μm by heating and contact bonding. A tensile stress in the tape winding operation was set to be 60 Mpa. The others were the same as in the example 1a so that a cured tubular body according to a comparative example 3a was obtained. The specification and evaluation result of the comparative example 3a is shown in the following Table 4.

TABLE 3

Prepreg Type and Prepreg Structure in Example and Comparative Example

| Sheet | Tip Ply Number | Fiber Angle (degree) | Resin type | Fiber Type | Item Number | Name of Company |
|---|---|---|---|---|---|---|
| h1 | 3 | −45 | Epoxy | M40S | 9255S-11 | Toray |
| h2 | 3 | 45 | Epoxy | M40S | 9255S-11 | Toray |
| h3 | 3 | 0 | Epoxy | T800G | 2255G-10 | Toray |
| h4 | 1 | 90 | Epoxy | M30S | 805S-3 | Toray |
| h5 | 2 | 0 | Epoxy | T800G | 2255G-10 | Toray |
| h6 | 4 | 0 | Epoxy | T800G | 2255G-10 | Toray |

TABLE 4

Specification and Evaluation Result in Example and Comparative Example

| | | Unit | Example 1a | Example 2a | Example 3a | Example 4a | Example 5a | Example 6a | Example 7a |
|---|---|---|---|---|---|---|---|---|---|
| First Winding Step | Tape Type | | Nylon Taffeta | Nylon Taffeta | Nylon Taffeta | Nylon Taffeta | Nylon Taffeta | Nylon Taffeta | Nylon Taffeta |
| | Width W1a | mm | 15 | 15 | 15 | 15 | 15 | 15 | 15 |
| | Thickness d1a | μm | 100 | 100 | 100 | 100 | 100 | 100 | 100 |
| | Tensile Stress T1a | Mpa | 15 | 20 | 35 | 40 | 54 | 57 | 60 |
| Second Winding Step | Tape Type | | EPDM | EPDM | EPDM | EPDM | EPDM | EPDM | EPDM |
| | Width W2a | mm | 12.5 | 12.5 | 12.5 | 12.5 | 12.5 | 12.5 | 12.5 |
| | Thickness d2a | μm | 1000 | 1000 | 1000 | 1000 | 1000 | 1000 | 1000 |
| | Tensile Stress T2a | Mpa | 12 | 12 | 10 | 8 | 6 | 4 | 3 |
| T2a/T1a | | | 0.80 | 0.60 | 0.29 | 0.20 | 0.11 | 0.07 | 0.05 |
| Degree of Wrinkle | | | 1 | 1 | 1 | 1 | 1 | 1 | 1 |
| Fiber Content Z1 | | wt % | 75 | 75 | 75 | 75 | 75 | 75 | 75 |
| Fiber Content Z2 | | wt % | 80 | 80 | 80 | 79 | 79 | 78 | 78 |
| Z2 − Z1 | | wt % | 5 | 5 | 5 | 4 | 4 | 3 | 3 |
| Weight of Cured Tubular Body (Wt) | | g | 45 | 45 | 45 | 46 | 46 | 46 | 46 |
| Forwad Flex Fj | | mm | 140 | 140 | 140 | 139 | 138 | 136 | 137 |
| 1/(Fj × Wt) | | | 0.000159 | 0.000159 | 0.000159 | 0.000156 | 0.000158 | 0.000160 | 0.000159 |

| | | | Example 8a | Example 9a | Example 10a | Example 11a | Comparative Example 1a | Comparative Example 2a | Comparative Example 3a |
|---|---|---|---|---|---|---|---|---|---|
| First Winding Step | Tape Type | | Nylon Taffeta | Nylon Taffeta | Nylon Taffeta | Nylon Taffeta | PP | PET | Integrated Tape |
| | Width W1a | | 15 | 15 | 15 | 15 | 25 | 15 | 15 |
| | Thickness d1a | | 100 | 100 | 100 | 100 | 30 | 25 | 115 |
| | Tensile Stress T1a | | 40 | 20 | 20 | 20 | 60 | 60 | 60 |
| Second Winding Step | Tape Type | | Butyl | EPDM | EPDM | EPDM | — | — | — |
| | Width W2a | | 25 | 12.5 | 12.5 | 12.5 | — | — | — |
| | Thickness d2a | | 550 | 1000 | 1000 | 1000 | — | — | — |
| | Tensile Stress T2a | | 5 | 24 | 30 | 36 | — | — | — |
| T2a/T1a | | | 0.13 | 1.20 | 1.50 | 1.80 | — | — | — |
| Degree of Wrinkle | | | 1 | 2 | 2 | 3 | 1 | 1 | 3 |
| Fiber Content Z1 | | | 75 | 75 | 75 | 75 | 75 | 75 | 75 |
| Fiber Content Z2 | | | 79 | 81 | 82 | 82 | 75 | 75 | 78 |
| Z2 − Z1 | | | 4 | 6 | 7 | 7 | 0 | 0 | 3 |
| Weight of Cured Tubular Body (Wt) | | | 46 | 45 | 44 | 44 | 48 | 48 | 47 |
| Forwad Flex Fj | | | 139 | 141 | 142 | 142 | 139 | 139 | 140 |
| 1/(Fj × Wt) | | | 0.000156 | 0.000158 | 0.000160 | 0.000160 | 0.000150 | 0.000150 | 0.000152 |

Integrated Tape: Wrapping Tape obtained by integrating Nylon Taffeta (Width 15 mm, Thickness 100 μm) and PP Tape (Width 15 mm, Thickness 30 μm) through Heating and Contact Bonding As shown in the Table 4, a difference (Z2−Z1) in each of the examples is equal to or greater than that in each of the comparative examples. In each of the examples, a large amount of the resin is eliminated from the intermediate formed body in the manufacturing process.

A value [1/(Fj×Wt)] obtained by dividing an inverse number (1/Fj) of the forward flex Fj by the weight Wt of the cured tubular body in each of the examples is greater than that in each of the comparative examples. When the inverse number (1/Fj) of the forward flex Fj is greater, a rigidity of the cured tubular body is higher. An increase in [1/(Fj×Wt)] implies an enhancement in a rigidity per unit weight. The rigidity per unit weight in each of the examples is higher than that in each of the comparative examples.

In the examples 1a to 8a, a ratio (T2a/T1a) is low so that no wrinkle was generated and an excellent result was thus obtained. In the example 6a, the ratio (T2a/T1a) is slightly low so that the difference (Z2−Z1) is smaller than that in each of the examples 1a to 5a. In the example 7, since the ratio (T2a/T1a) is low, the difference (Z2−Z1) is small.

In the examples 9a to 11a, the ratio (T2a/T1a) is slightly higher so that no wrinkle was generated. Since the difference (Z2−Z1) is greater, however, an excellent result was obtained in respect of a movement of the resin to the fabric tape. In the example 11a, since the ratio (T2a/T1a) is high, a greater wrinkle than that in each of the examples 9a and 10a was generated.

In the comparative example 3a, a torsion of the tape was generated at the tape winding step so that the wrinkle was generated on the cured tubular body due to the torsion.

In a golf club shaft, a head is attached to a tip portion. Therefore, a strength in the tip portion is particularly important. In the example 1a and the comparative example 1a, a void fraction Rb in the tip portion of the shaft was measured. As a result, the void fraction Rb in the comparative example 1a was 0.8%, while the void fraction Rb in the example 1a was 0.5%. The void fraction Rb according to the example 1a was reduced by 37.5% with respect to the void fraction Rb according to the comparative example 1a. A void area Sb and a sectional area Sm of the shaft were calculated based on a image of a section on a point placed apart from the tip of the shaft by 90 mm and the void fraction Rb was thus calculated in accordance with the following equation.

$$Rb(\%) = (Sb/Sm) \times 100$$

Next, description will be given to examples in which only a fabric tape was used.

[Measurement of Forward Flex]

A forward flex Fj measured by the method is shown in the following Table 6.

[Degree of Wrinkle]

A result of an evaluation in five stages through the method is shown in the following Table 6.

[Thickness of Fabric Tape]

A thickness of the fabric tape which is obtained by the method is shown as "Thickness d1b" in the following Table 6.

Example 1b

The mandrel shown in FIG. 9 was coated with a lubricant and six prepregs were then wound around the mandrel so that an intermediate formed body was obtained. Structures of the six prepregs are shown in FIG. 9. Types and structures of the prepregs of the sheets e1 to e6 are shown in the following Table 5. The sheets e1 to e6 are the prepregs manufactured by Toray Industries, Inc. "Tip Ply Number" in the Table 5 indicates the number of winds of the prepreg on the tip end portion Tp. "Fiber Angle" in Table 5 indicates an orientation angle of a carbon fiber with respect to an axial direction of a shaft. In each of the prepregs, an epoxy resin is used for a matrix resin. An item number of each of the prepregs and a type (item number) of the carbon fiber are shown in the Table 5.

Next, there was executed a tape winding step of winding a wrapping tape around an outer peripheral surface of the intermediate formed body. The tape winding step was carried out by means of a wrapping machine manufactured by YOKOTE TEKKOSHO. At the winding step, the number of winds was set to be one. The tape winding step was carried out with an application of a certain tension F1b. The tension F1b was measured by means of a load cell manufactured by NIDEC-SHIMPO CORPORATION. A tensile stress T1b was calculated based on the tension F1b.

At the tape winding step, only a fabric tape was wound. For the fabric tape, "NYLON TAFFETA (trade name)" sold by KINKI TAPE CO., LTD. was used. The NYLON TAFFETA is a fabric tape obtained by weaving a nylon fiber through a plain weave. A type of nylon constituting the nylon fiber is Nylon 6. The fabric tape had a width W1b of 15 mm and a thickness d1b of 100 μm. The tensile stress T1b at the tape winding step was set to be 15 Mpa. A ratio (P1b/W1b) was set to be (1/15), that is, approximately 0.06667. At the tape winding step, a winding pitch P1b was set to be 1 mm.

After the winding step, a curing step was carried out. At the curing step, heating was first executed at 80° C. for 30 minutes and the heating was then executed at 130° C. for 120 minutes.

Next, the mandrel was pulled out. Subsequently, the fabric tape was removed so that a cured tubular body according to the example 1b was obtained.

In the example 1b, a fiber content Z1 was 75% by weight. The fiber content Z1 indicates a fiber content of the intermediate formed body constituted by the sheets e1 to e6. The fiber content was calculated from a fiber content of the prepreg. A fiber content Z2 of the cured tubular body was calculated based on a weight Wt of the cured tubular body. Referring to the cured tubular body, a forward flex Fj was evaluated. The specification and evaluation result of the example 1b is shown in the following Table 6.

Examples 2b to 7b

A cured tubular body according to each example was obtained in the same manner as in the example 1b except that the tensile stress T1b and/or the ratio (P1b/W1b) were/was changed as shown in the Table 6. The specification and evaluation result is shown in the following Table 6.

Comparative Example 1b

A resin film tape was wound in place of the fabric tape. A tape constituted by a polypropylene film (PP film) was used for the resin film tape. More specifically, "PT-30H" (trade name) manufactured by SHIN-ETSU FILM CO., LTD. was used for the PP film tape. A width of the tape was 25 mm. A ratio (P1b/W1b) was set to be (1/12), that is, approximately 0.08333. A tensile stress in the tape winding operation was set to be 60 Mpa. The others were the same as in the example 1b so that a cured tubular body according to a comparative example 1b was obtained. The specification and evaluation result of the comparative example 1b is shown in the following Table 6.

Comparative Example 2b

A resin film tape was wound in place of the fabric tape. A tape constituted by a polyehylene terephthalate film (PET film) was used for the resin film tape. Specifically, "PET-25K" (trade name) manufactured by SHIN-ETSU FILM CO., LTD. was used for the PET film tape. A width of the tape was 15 mm. A ratio (P1$b$/W1$b$) was set to be (1/7), that is, approximately 0.1429. A tensile stress in the tape winding operation was set to be 60 Mpa. The others were the same as in the example 1b so that a cured tubular body according to a comparative example 2b was obtained. The specification and evaluation result of the comparative example 2b is shown in the following Table 6.

Comparative Example 3b

An integrated tape was wound in place of the fabric tape. The integrated tape was obtained by integrating NYLON TAFFETA having a width of 15 mm and a thickness of 100 μm and a PP film tape having a width of 15 mm and a thickness of 30 μm by heating and contact bonding. A ratio (P1$b$/W1$b$) was set to be (1/7), that is, approximately 0.1429. A tensile stress in the tape winding operation was set to be 60 Mpa. The others were the same as in the example 1b so that a cured tubular body according to a comparative example 3b was obtained. The specification and evaluation result of the comparative example 3b is shown in the following Table 6.

TABLE 5

Prepreg Type and Prepreg Structure in Example and Comparative Example

| Tip Ply Sheet | Tip Ply Number | Fiber Angle (degree) | Resin Type | Fiber Type | Item Number | Name of Company |
|---|---|---|---|---|---|---|
| e1 | 3 | −45 | Epoxy | M40S | 9255S-11 | Toray |
| e2 | 3 | 45 | Epoxy | M40S | 9255S-11 | Toray |
| e3 | 3 | 0 | Epoxy | T800G | 2255G-10 | Toray |
| e4 | 1 | 90 | Epoxy | M30S | 805S-3 | Toray |
| e5 | 2 | 0 | Epoxy | T800G | 2255G-10 | Toray |
| e6 | 4 | 0 | Epoxy | T800G | 2255G-10 | Toray |

TABLE 6

Specification and Evaluation Result in Example and Comparative Example

| | | Unit | Example 1b | Example 2b | Example 3b | Example 4b | Example 5b |
|---|---|---|---|---|---|---|---|
| Winding Step | Tape Type | | Nylon Taffeta | Nylon Taffeta | Nylon Taffeta | Nylon Taffeta | Nylon Taffeta |
| | Width W1b | mm | 15 | 15 | 15 | 15 | 15 |
| | Thickness d1b | μm | 100 | 100 | 100 | 100 | 100 |
| | Tensile Stress T1b | Mpa | 15 | 20 | 50 | 50 | 50 |
| | Ratio (P1b/W1b) | mm/mm | 1/15 | 1/12 | 1/10 | 1/8 | 1/5 |
| | Average Number of Wrapping Layer La | Layer | 15 | 12 | 10 | 8 | 5 |
| | Degree of Wrinkle | | 2 | 1 | 1 | 1 | 1 |
| | Fiber Content Z1 | wt % | 75 | 75 | 75 | 75 | 75 |
| | Fiber Content Z2 | wt % | 79 | 80 | 83 | 82 | 81 |
| | Z2 − Z1 | wt % | 4 | 5 | 8 | 7 | 6 |
| | Weight of Cured Tubular Body (Wt) | g | 46 | 46 | 45 | 46 | 46 |
| | Forward Flex Fj | mm | 142 | 141 | 145 | 144 | 143 |
| | 1/(Fj × Wt) | | 0.000153 | 0.000154 | 0.000153 | 0.000151 | 0.000152 |

| | | | Example 6b | Example 7b | Comparative Example 1b | Comparative Example 2b | Comparative Example 3b |
|---|---|---|---|---|---|---|---|
| Winding Step | Tape Type | | Nylon Taffeta | Nylon Taffeta | PP | PET | Integrated Tape |
| | Width W1b | | 15 | 15 | 25 | 15 | 15 |
| | Thickness d1b | | 100 | 100 | 30 | 25 | 115 |
| | Tensile Stress T1b | | 55 | 60 | 60 | 60 | 60 |
| | Ratio (P1b/W1b) | | 1/3 | 1/2 | 1/12 | 1/7 | 1/7 |
| | Average Number of Wrapping Layer La | | 3 | 2 | 12 | 7 | 7 |
| | Degree of Wrinkle | | 1 | 1 | 1 | 1 | 3 |
| | Fiber Content Z1 | | 75 | 75 | 75 | 75 | 75 |
| | Fiber Content Z2 | | 80 | 79 | 75 | 75 | 78 |
| | Z2 − Z1 | | 5 | 4 | 0 | 0 | 3 |
| | Weight of Cured Tubular Body (Wt) | | 46 | 46 | 48 | 48 | 47 |
| | Forward Flex Fj | | 141 | 142 | 139 | 139 | 140 |
| | 1/(Fj × Wt) | | 0.000154 | 0.000153 | 0.000150 | 0.000150 | 0.000152 |

As shown in the Table 6, a difference (Z2−Z1) in each of the examples is greater than that in each of the comparative examples. In the examples, thus, an amount of the resin eliminated from the intermediate formed body is large in the manufacturing process.

In the examples, since an amount of decrease of the resin is large, an outside diameter of the cured tubular body is reduced. For this reason, the outside diameter in each of the examples is slightly smaller than the outside diameter in each of the comparative examples. Due to the difference between the outside diameters, the forward flex Fj in each of the examples is greater than that in each of the comparative examples. Since a content of the fiber is equal in the examples and the comparative examples, a difference in the forward flex Fj is very small. A value [1/(Fj×Wt)] obtained by dividing an inverse number (1/Fj) of the forward flex Fj by the weight Wt of the cured tubular body in each of the examples is greater than that in each of the comparative examples. When the inverse number (1/Fj) of the forward flex Fj is greater, a rigidity of the cured tubular body is higher. An increase in [1/(Fj×Wt)] implies an enhancement in a rigidity per unit weight. The rigidity per unit weight in each of the examples is higher than that in each of the comparative examples.

In the comparative example 3b, a torsion of the tape is generated at the tape winding step and the wrinkle is generated on the cured tubular body due to the torsion.

In the example 1b, the average number La of the wrapping layer and the number L1 of the wrapping layer are large. For this reason, the wrinkle is generated slightly. The wrinkle in the example 1b is more excellent than that in the comparative example 3b. (Z2−Z1) in each of the examples 3b to 5b is greater than that in each of the examples 6b and 7b. This effect is obtained by increasing the average number La of the wrapping layer.

In a golf club shaft, a head is attached to a tip portion. Therefore, a strength in the tip portion is particularly important. In the example 1b and the comparative example 1b, a void fraction Rb in the tip portion of the shaft was measured. As a result, the void fraction Rb in the comparative example 1b was 0.8%, while the void fraction Rb in the example 1b was 0.3% which was reduced by 63% with respect to the void fraction Rb according to the comparative example 1b. A void area Sb and a sectional area Sm of the shaft were calculated based on an image of a section on a point placed apart from the tip of the shaft by 90 mm and the void fraction Rb was thus calculated in accordance with the following equation.

$$Rb(\%) = (Sb/Sm) \times 100$$

Thus, the evaluation in each of the examples is higher than that in each of the comparative examples. From the result of the evaluation, advantages of the present invention are apparent.

The present invention can be applied to all FRP tubular bodies including the golf club shaft.

The above description is only illustrative and various changes can be made without departing from the scope of the present invention.

What is claimed is:

1. A method of manufacturing a tubular body formed by a fiber reinforced resin, wherein said manufacturing method is a sheet winding process comprising the steps of:
   winding a fiber reinforced resin member containing a fiber and a matrix resin around a tapered mandrel, thereby obtaining an intermediate formed body having a fiber content equal to or higher than 70% by weight;
   winding a wrapping tape around an outer peripheral surface of the intermediate formed body with an application of a tension, wherein an independent fabric tape is used as the wrapping tape and the fabric tape is directly wound around the outer peripheral surface of the intermediate formed body in this tape winding step;
   heating the intermediate formed body having the wrapping tape wound therearound in a first stage at a temperature of 60 to 115° C. for 10 to 120 minutes and in a second, subsequent stage at 120 to 200° C. for 60 to 240 minutes, thereby curing the matrix resin; and
   pulling the tapered mandrel out and removing the wrapping tape after the curing step, thereby obtaining a cured tubular body,
   wherein when a fiber content of the intermediate formed body is represented by Z1 (% by weight) and a fiber content of the cured tubular body is represented by Z2 (% by weight), a difference (Z2−Z1) is equal to or greater than 3% by weight and is equal to or smaller than 25% by weight, and
   wherein the wound wrapping tape has an overlapping portion in which the fabric tapes overlap each other, and
   wherein the fabric tape has a void or a hole between woven fibers, whereby the resin contained in the fiber reinforced resin member can be moved to the void or the hole of the fabric tape in the manufacturing process.

2. The manufacturing method according to claim 1, wherein the tape winding step includes a first winding step of winding a fabric tape around the outer peripheral surface of the intermediate formed body and a second winding step of winding a resin film tape after the first winding step.

3. The manufacturing method according to claim 2, wherein a tensile stress T1 to be applied to the fabric tape is equal to or higher than 5 (Mpa) and is equal to or lower than 150 (Mpa) at the first winding step.

4. The manufacturing method according to claim 2, wherein when a tensile stress to be applied to the fabric tape at the first winding step is represented by T1 and a tensile stress to be applied to the resin film tape at the second winding step is represented by T2, a ratio (T1/T2) is equal to or higher than 0.1 and is equal to or lower than 0.95.

5. The manufacturing method according to claim 2, wherein an internal surface of the resin film tape is provided with a silicone type or fluorine type coating material.

6. The manufacturing method according to claim 1, wherein the tape winding step includes a first winding step of winding a fabric tape around the outer peripheral surface of the intermediate formed body and a second winding step of winding a rubber tape after the first winding step.

7. The manufacturing method according to claim 6, wherein a tensile stress T1a to be applied to the fabric tape is equal to or higher than 5 (Mpa) and is equal to or lower than 150 (Mpa) at the first winding step.

8. The manufacturing method according to claim 6, wherein when a tensile stress to be applied to the fabric tape at the first winding step is represented by T1a and a tensile stress to be applied at the second winding step to the rubber tape is represented by T2a, a ratio (T2a/T1a) is equal to or higher than 0.1.

9. The manufacturing method according to claim 6, wherein an internal surface of the rubber tape is provided with a silicone type or fluorine type coating material.

10. The manufacturing method according to claim 1, wherein the wrapping tape is a fabric tape only.

11. The manufacturing method according to claim 10, wherein a tensile stress T1b to be applied to the fabric tape is equal to or greater than 5 (Mpa) and is equal to or smaller than 150 (Mpa) at the tape winding step.

12. The manufacturing method according to claim 10, wherein a number L1 of wrapping layers of the fabric tape wound at the tape winding step is one or more on all points from a tip end position Tp1 of the tubular body to a butt end position Bt1 of the tubular body.

\* \* \* \* \*